(12) United States Patent
Sumi et al.

(10) Patent No.: US 10,714,932 B2
(45) Date of Patent: Jul. 14, 2020

(54) ELECTROSTATIC DISCHARGE PROTECTION DEVICE AND METHOD OF MANUFACTURING THE SAME

(71) Applicant: Murata Manufacturing Co., Ltd., Nagaokakyo-shi, Kyoto-fu (JP)

(72) Inventors: Takahiro Sumi, Nagaokakyo (JP); Jun Adachi, Nagaokakyo (JP); Takayuki Tsukizawa, Nagaokakyo (JP); Katsumi Yasunaka, Nagaokakyo (JP); Sumiyo Nakamura, Nagaokakyo (JP); Mayu Suzuki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 805 days.

(21) Appl. No.: 15/375,392

(22) Filed: Dec. 12, 2016

(65) Prior Publication Data

US 2017/0093150 A1    Mar. 30, 2017

Related U.S. Application Data

(63) Continuation of application No. PCT/JP2015/066298, filed on Jun. 5, 2015.

(30) Foreign Application Priority Data

Jun. 24, 2014  (JP) .................................. 2014-129418

(51) Int. Cl.
*H02H 9/04* (2006.01)
*H01T 4/12* (2006.01)
*H01T 1/20* (2006.01)

(52) U.S. Cl.
CPC .............. *H02H 9/044* (2013.01); *H01T 1/20* (2013.01); *H01T 4/12* (2013.01)

(58) Field of Classification Search
CPC ............. H01L 21/02529; H01L 21/283; H01L 21/76801; H01L 23/60; H01L 27/0288;
(Continued)

(56) References Cited

U.S. PATENT DOCUMENTS 6,534,422 B1 *  3/2003  Ichikawa ........... H01L 21/76801
                                                        257/E21.576
2008/0079533 A1    4/2008  Liu et al.
(Continued)

FOREIGN PATENT DOCUMENTS

JP       2008-85284 A      4/2008
JP       2010-129320 A     6/2010
(Continued)

OTHER PUBLICATIONS

Official Communication issued in corresponding International Application PCT/JP2015/066298, dated Jul. 14, 2015.

*Primary Examiner* — Thienvu V Tran
*Assistant Examiner* — Nicolas Bellido
(74) *Attorney, Agent, or Firm* — Keating & Bennett, LLP

(57) ABSTRACT

An ESD protection device includes an insulating substrate, first and second discharge electrodes in contact with the insulating substrate, the first and second discharge electrodes separated from each other and opposing each other, first and second outer electrodes on an outside surface of the insulating substrate, the first outer electrode being electrically connected to the first discharge electrode and the second outer electrode being electrically connected to the second discharge electrode, and a discharge auxiliary electrode spanning the first discharge electrode and the second discharge electrode in a region where the discharge electrodes oppose each other. The discharge auxiliary electrode includes semiconductor particles and metal particles. An average particle diameter of the metal particles is about 0.3 µm to about 1.5 µm. A density of the metal particles is greater than or equal to about 20 particles/50 µm$^2$ and the semiconductor particles include an oxygen-containing layer on surfaces of the semiconductor particles.

13 Claims, 5 Drawing Sheets

(58) Field of Classification Search
CPC . H01L 28/60; H01L 2924/09701; H01T 1/20; H01T 1/22; H01T 2/02; H01T 21/00; H01T 4/10; H01T 4/12; H02H 9/044; H02H 9/046; H05F 3/04; H05K 1/026; H05K 2201/09063; H05K 7/00; Y10T 29/49002

See application file for complete search history.

(56) References Cited

U.S. PATENT DOCUMENTS

| | | | |
|---|---|---|---|
| 2011/0222197 A1* | 9/2011 | Adachi | H01T 4/12 361/56 |
| 2011/0222203 A1* | 9/2011 | Adachi | H01T 1/20 361/220 |
| 2012/0236450 A1 | 9/2012 | Kdachi | |
| 2013/0222956 A1* | 8/2013 | Hiehata | H01C 7/12 361/56 |
| 2014/0126102 A1* | 5/2014 | Sumi | H01T 4/12 361/220 |
| 2014/0321009 A1* | 10/2014 | Kwak | H05K 9/0079 361/56 |
| 2015/0131193 A1 | 5/2015 | Okamoto | |

FOREIGN PATENT DOCUMENTS

| | | |
|---|---|---|
| JP | 2012-209244 A | 10/2012 |
| WO | 2008/146514 A1 | 12/2008 |
| WO | 2013/011821 A1 | 1/2013 |
| WO | 2014/027553 A1 | 2/2014 |

* cited by examiner 51  71

71  51

71
72

ELECTROSTATIC DISCHARGE PROTECTION DEVICE AND METHOD OF MANUFACTURING THE SAME

CROSS REFERENCE TO RELATED APPLICATIONS

This application claims the benefit of priority to Japanese Patent Application No. 2014-129418 filed on Jun. 24, 2014 and is a Continuation application of PCT Application No. PCT/JP2015/066298 filed on Jun. 5, 2015. The entire contents of each application are hereby incorporated herein by reference.

BACKGROUND OF THE INVENTION

1. Field of the Invention

The present invention relates to an electrostatic discharge protection device that protects an electronic device from damage caused by electrostatic discharge, and to a method of manufacturing the same.

2. Description of the Related Art

Electrostatic discharge protection devices (ESD protection devices) are broadly used to prevent damage, erroneous operations, and the like in electronic devices caused by electrostatic discharge (ESD).

For example, International Publication WO 2008/146514 discloses an ESD protection device having a multilayer ceramic substrate, a hollow cavity portion formed within the multilayer ceramic substrate, at least one pair of discharge electrodes having opposing portions arranged so that tip portions thereof oppose each other with an interval within the hollow cavity portion, and an outer electrode that is formed on a surface of the multilayer ceramic substrate and is connected to the discharge electrodes. According to the ESD protection device disclosed in International Publication WO 2008/146514, the multilayer ceramic substrate includes a mixed portion containing a metal material and a ceramic material, the mixed portion being disposed near the surface where the discharge electrodes are provided and adjacent to at least an opposing portion and a part that is between the opposing portions of the discharge electrodes. The content of the metal material in the mixed portion is greater than or equal to 10 vol % and less than or equal to 50 vol %. By having the above-described configuration, the ESD protection device disclosed in International Publication WO 2008/146514 can accurately set a discharge start voltage.

International Publication WO 2013/011821 discloses an ESD protection device including first and second discharge electrodes opposing each other, a discharge auxiliary electrode extending across the first and second discharge electrodes, and an insulating substrate that holds the first and second discharge electrodes along with the discharge auxiliary electrode. In the ESD protection device disclosed in International Publication WO 2013/011821, the discharge auxiliary electrode includes a combination of a plurality of metal particles including a core-shell structure including a core portion that has a first metal as its primary component and a shell portion that has a metal oxide containing a second metal as its primary component. By having the above-described configuration, the ESD protection device disclosed in International Publication WO 2013/011821 provides high insulation reliability and favorable discharge characteristics.

Japanese Unexamined Patent Application Publication No. 2008-85284 discloses an overvoltage protection element including a first electrode, a second electrode, and a porous structure, connected between the first electrode and the second electrode, that is produced by carrying out a firing process using materials of the overvoltage protection element, which include a non-conductive powder, a metal conductive powder, and a bonding agent. Using the above-described materials of the overvoltage protection element when manufacturing the overvoltage protection element disclosed in Japanese Unexamined Patent Application Publication No. 2008-85284 makes it possible to significantly reduce or prevent damage caused by discharged energy, which in turn makes it possible to extend the usage lifespan of the element.

Recently, as electronic devices continue to have higher levels of performance, there is demand for lower discharge start voltages in ESD protection devices for the purpose of more reliably preventing damage, erroneous operations, and the like in electronic devices caused by electrostatic discharge. On the other hand, there is also demand for ESD protection devices to have insulation properties (initial insulation properties) high enough to significantly reduce or prevent the occurrence of short-circuit in normal usage situations. There is also a demand for the development of ESD protection devices having superior repetition resistance, or in other words, that are capable of suppressing drops in insulation properties even under the repeated application of ESD.

SUMMARY OF THE INVENTION

Preferred embodiments of the present invention provide an electrostatic discharge protection device having favorable initial insulation properties and repetition resistance, and having a favorable operation rate at a comparatively low discharge voltage of about 2 kV.

The inventors of preferred embodiments of the present invention carried out research focusing on the composition of the discharge auxiliary electrode extending between two discharge electrodes separated from each other and opposing each other in an ESD protection device. As a result, the inventors of preferred embodiments of the present invention discovered that using a discharge auxiliary electrode containing semiconductor particles including an oxygen-containing layer on their surfaces and metal particles, and setting the average particle diameter and density of the metal particles within the discharge auxiliary electrode to be within a specific numerical range, make it possible to achieve favorable initial insulation properties and repetition resistance, and a favorable operation rate at a comparatively low discharge voltage.

According to a first aspect of a preferred embodiment of the present invention, an electrostatic discharge protection device includes an insulating substrate; first and second discharge electrodes in contact with the insulating substrate, the first and second discharge electrodes being separated from each other and opposing each other; first and second outer electrodes provided on an outside surface of the insulating substrate, the first outer electrode being electrically connected to the first discharge electrode and the second outer electrode being electrically connected to the second discharge electrode; and a discharge auxiliary electrode extending across the first discharge electrode and the second discharge electrode in a region where the first and second discharge electrodes oppose each other, wherein the discharge auxiliary electrode includes at least semiconductor particles and metal particles; an average particle diameter of the metal particles is about 0.3 μm to about 1.5 μm; a density of the metal particles in a random cross-section of the discharge auxiliary electrode is greater than or equal to about 20 particles/50 μm²; and the semiconductor particles include an oxygen-containing layer on the surfaces of the semiconductor particles.

According to a second aspect of a preferred embodiment of the present invention, a method of manufacturing an electrostatic discharge protection device includes forming an unfired discharge auxiliary electrode by applying a discharge auxiliary electrode paste containing metal particles, semiconductor particles including an oxygen-containing layer on the surfaces of the semiconductor particles and an oxygen content of about 1.0 wt % to about 7.0 wt %, and an organic vehicle, to one main surface of a first ceramic green sheet, an average particle diameter of the metal particles being about 0.10 μm to about 1.00 μm and a volume fraction of the metal particles relative to all non-combustive components including the metal particles and the semiconductor particles being about 15 vol % to about 40 vol %; a step of forming first and second unfired discharge electrodes by applying a discharge electrode paste on the first ceramic green sheet to which the discharge auxiliary electrode paste has been applied, the first and second unfired discharge electrodes being at least partially disposed on the unfired discharge auxiliary electrode and being separated from each other and opposing each other on the unfired discharge auxiliary electrode; applying a hollow cavity portion formation paste on the first ceramic green sheet to which the discharge auxiliary electrode paste and the discharge electrode paste have been applied, the hollow cavity portion formation paste being applied so as to cover at least a region where the first and second unfired discharge electrodes oppose each other; forming an unfired multilayer body by stacking a second ceramic green sheet on the first ceramic green sheet to which the discharge auxiliary electrode paste, the discharge electrode paste, and the hollow cavity portion formation paste have been applied and shaping the ceramic green sheets to predetermined dimensions; firing the unfired multilayer body to obtain a multilayer body including the ceramic substrate, the first and second discharge electrodes, the discharge auxiliary electrode, and the hollow cavity portion; forming first and second unfired outer electrodes by applying an outer electrode paste to an outside surface of the fired multilayer body, the first unfired outer electrode being formed in contact with the first discharge electrode and the second unfired outer electrode being formed in contact with the second discharge electrode; and forming first and second outer electrodes by subjecting the unfired first and second outer electrodes to a baking process.

By having the above-described configuration, a electrostatic discharge protection device according to a preferred embodiment of the present invention has favorable initial insulation properties and has a favorable operation rate at a comparatively low discharge voltage of about 2 kV, for example. Additionally, by having the above-described configuration, a method of manufacturing an electrostatic discharge protection device according to a preferred embodiment of the present invention makes it possible to provide an electrostatic discharge protection device having favorable initial insulation properties and repetition resistance, and having a favorable operation rate at a comparatively low discharge voltage of about 2 kV, for example.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
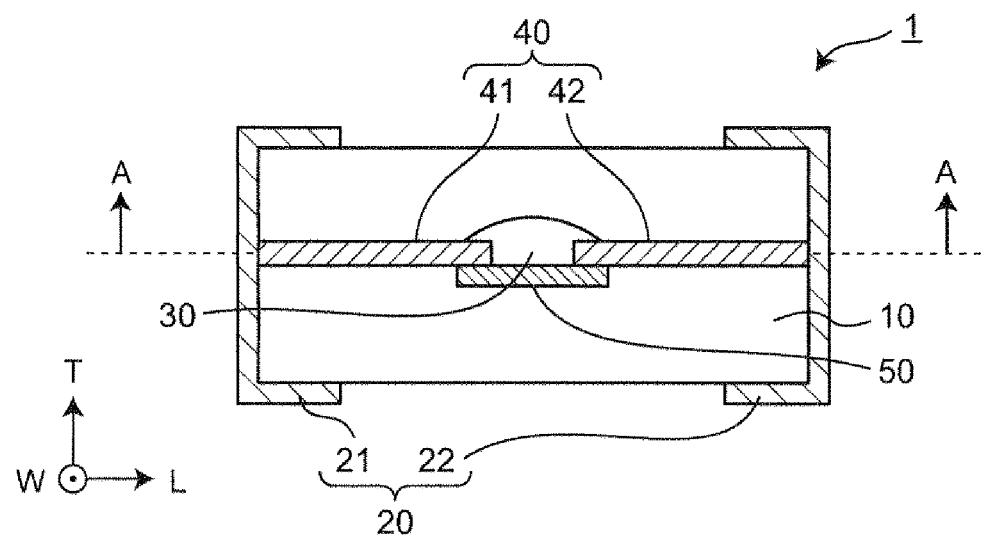
FIG. 1 is a schematic cross-sectional view of a configuration of an ESD protection device according to a first preferred embodiment of the present invention.

Hereinafter, preferred embodiments of the present invention will be described with reference to the drawings. Note, however, that the preferred embodiments described hereinafter are for exemplary purposes only, and the present invention is not intended to be limited to the following preferred embodiments. The dimensions, materials, shapes, relative positions, and so on of the constituent elements described hereinafter are unless otherwise specified merely examples for descriptive purposes, and the scope of the present invention is not intended to be limited only thereto. Furthermore, the sizes, shapes, positional relationships, and so on of the constituent elements illustrated in the drawings may be exaggerated to clarify the descriptions.

FIG. 1 is a schematic cross-sectional view illustrating the configuration of an electrostatic discharge (ESD) protection device 1 according to a preferred embodiment of the present invention. The ESD protection device 1 illustrated in FIG. 1 includes an insulating substrate 10, a first discharge electrode and a second discharge electrode 42 (sometimes collectively referred to as discharge electrodes 40) in contact with the insulating substrate 10, a first outer electrode 21 and a second outer electrode 22 (sometimes collectively referred to as outer electrodes 20) provided on an outside surface of the insulating substrate 10, and a discharge auxiliary electrode 50 extending across the first discharge electrode 41 and the second discharge electrode 42 in a region where the first discharge electrode 41 and the second discharge electrode 42 oppose each other.

In an ESD protection device according to a preferred embodiment of the present invention, a mechanism enabling favorable initial insulation properties and a favorable operation rate at a comparatively low discharge voltage (about 2 kV, for example) to be achieved is not restricted to any particular theory, and can generally be thought of as follows. When a high voltage exceeding a discharge start voltage is applied to the ESD protection device 1 illustrated in FIG. 1, a gaseous discharge and a surface discharge occur at an area where the discharge electrodes 40 oppose each other. The discharge auxiliary electrode 50 has a function of inducing the surface discharge. A discharge start voltage produced by a surface discharge normally tends to be lower than a discharge start voltage produced by a gaseous discharge. Providing the discharge auxiliary electrode 50 therefore makes it possible to lower the discharge start voltage.

In an ESD protection device according to a preferred embodiment of the present invention, the discharge auxiliary electrode contains semiconductor particles in addition to metal particles and thus is insulating as a whole. The occurrence of shorting caused by metal particles making contact with each other is therefore able to be significantly reduced or prevented, which makes it possible to achieve favorable initial insulation properties.

Furthermore, the smaller the metal particles in the discharge auxiliary electrode are, the easier it is for an electric field to concentrate between end portions of the discharge electrodes and the metal particles in the discharge auxiliary electrode, which tends to increase the electric field that is produced. The metal particles contained in a discharge auxiliary electrode according to a preferred embodiment of the present invention are extremely fine particles including an average particle diameter of about 0.3 µm to about 1.5 µm, and thus a greater electric field is able to be produced. Additionally, as the amount of metal particles contained in the discharge auxiliary electrode increases, so does the number of points that produce an electric field (electric field points). In a discharge auxiliary electrode according to a preferred embodiment of the present invention, the density of the metal particles in a given cross-section is greater than or equal to about 20 particles/50 µm$^2$, and thus many metal particles are present. This makes it possible to produce many electric field points. In the present preferred embodiment, it is thought that leader streamers (electron avalanches) are generated at the end portion of one of the discharge electrodes (the first discharge electrode, for example) due to the above-described electric field concentration. A discharge auxiliary electrode according to a preferred embodiment of the present invention includes many metal particles, and thus a large amount of leader streamers are able to be generated. This makes it possible to ensure the leader streamers reach the other discharge electrode (the second discharge electrode, for example) without losing speed. As a result, an ESD protection device according to a preferred embodiment of the present invention effectively produces a surface discharge between the discharge electrodes, which makes it possible to achieve a favorable operation rate at a comparatively low discharge voltage (about 2 kV, for example).

Furthermore, in the case where a gas present in the region between the discharge electrodes is a gas that ionizes easily, such as a noble gas, the gas molecules ionize more easily, which makes it possible to produce a large amount of gas ions. A surface discharge is able to be produced even more effectively between the discharge electrodes as a result, which makes it possible to improve the operation rate at a comparatively low discharge voltage (about 2 kV, for example) even more.

Figure 2A:
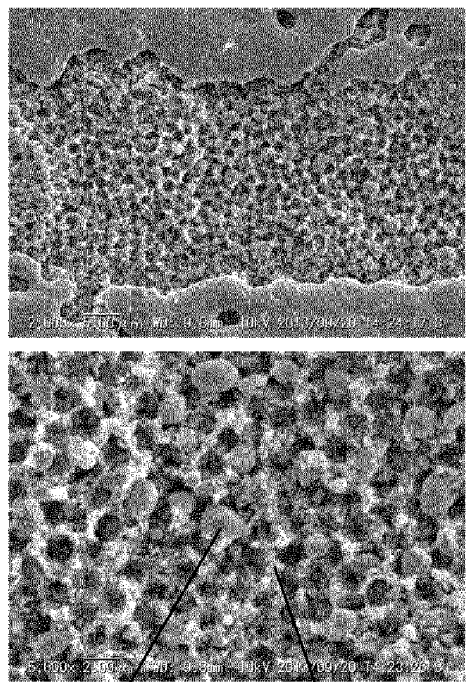
FIG. 2A is a scanning electron microscope (SEM) image of a discharge auxiliary electrode before ESD application.
Figure 2B:
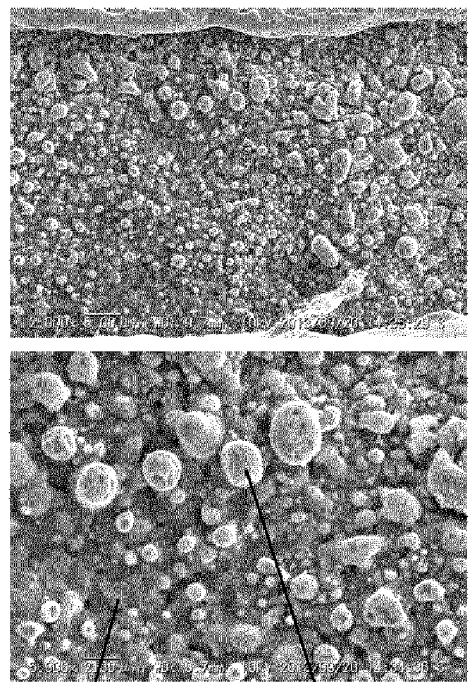
FIG. 2B is an SEM image of the discharge auxiliary electrode after ESD application.
Figure 2C:
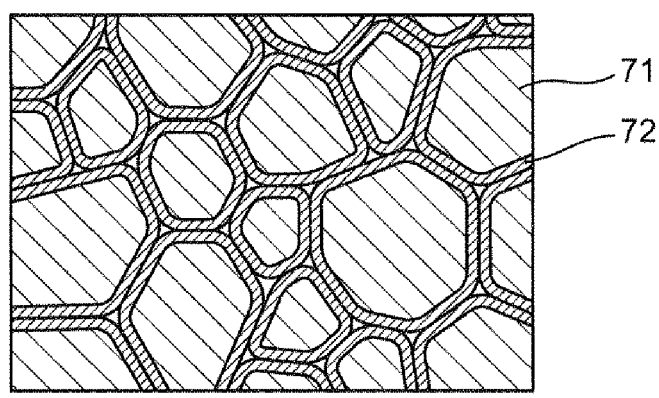
FIG. 2C is a schematic diagram illustrating semiconductor particles sintered by ESD application.

On the other hand, when ESD is applied to the ESD protection device, heat is produced when the above-described leader streams advance. The heat produced heats the discharge auxiliary electrode to a high temperature, and the semiconductor particles present in the discharge auxiliary electrode are sintered. FIG. 2A is a scanning electron microscope (SEM) image of the discharge auxiliary electrode before ESD application, and FIG. 2B is an SEM image of the discharge auxiliary electrode after the ESD application. The discharge auxiliary electrode includes metal particles 51 and semiconductor particles 71. Comparing FIGS. 2A and 2B, it can be seen that when ESD is applied, the semiconductor particles 71 are sintered and form clumps. When the semiconductor particles 71 are sintered, grain boundary layers having high resistance values are formed between the semiconductor particles 71. This type of structure, in which semiconductor particles 71 make contact with each other with high-resistance grain boundary layers therebetween, is typically called a "varistor structure". FIG. 2C schematically illustrates the semiconductor particles 71 that have been sintered by the ESD application and have defined the varistor structure. The conductivity of the varistor structure depends on the thickness of an insulation layer present at the grain boundaries of the semiconductor particles 71. The varistor structure has a higher conductivity in the case where the insulation layer present at the semiconductor grain boundaries is thin. As such, when the semiconductor particles 71 in the discharge auxiliary electrode define a varistor structure as a result of ESD application, there is a risk that the resistance value of the discharge auxiliary electrode will drop. In response to this, in an ESD protection device according to a preferred embodiment of the present invention, the semiconductor particles 71 present in the discharge auxiliary electrode have, on the surfaces thereof, an insulating oxygen-containing layer 72. As such, even in the case where the semiconductor particles 71 are sintered as a result of heat being produced by ESD application, an insulating layer is able to be effectively provided at the grain boundaries of the semiconductor particles 71, which makes it possible to significantly reduce or prevent a drop in the insulation properties after ESD application.

First Preferred Embodiment

FIG. 1 is a schematic cross-sectional view illustrating an electrostatic discharge protection device (ESD protection device) according to a first preferred embodiment of the present invention. The ESD protection device 1 illustrated in FIG. 1 includes the insulating substrate 10, the first discharge electrode 41 and the second discharge electrode 42 in contact with the insulating substrate 10, the first outer electrode 21 and the second outer electrode 22 provided on an outside surface of the insulating substrate 10, and the discharge auxiliary electrode 50 extending across the first discharge electrode 41 and the second discharge electrode 42 in a region where the first discharge electrode 41 and the second discharge electrode 42 oppose each other. The ESD protection device 1 according to the present preferred embodiment further includes a hollow cavity portion 30. As indicated in FIG. 1, in the present specification, a direction parallel or substantially parallel to a direction in which the first and second discharge electrodes substantially extend is called a length direction (L direction), a direction orthogonal or substantially orthogonal to the length direction in a horizontal plane is called a width direction (W direction), and a direction orthogonal or substantially orthogonal to both the length direction and the width direction is called a thickness direction (T direction). A plane orthogonal or substantially orthogonal to the L direction may be called a WT plane, a plane orthogonal or substantially orthogonal to the W direction may be called an LT plane, and a plane orthogonal or substantially orthogonal to the T direction may be called an LW plane.

The insulating substrate 10 is not particularly limited as long as the substrate is insulating, and may be a ceramic substrate, for example. Any ceramic material generally applied in ceramic substrates can be used as appropriate in the case where the insulating substrate 10 is a ceramic substrate, but the present invention is not limited thereto. For example, a ceramic material containing Ba, Al, and Si as primary components (BAS), Low Temperature Cofirable Ceramics (LTCC) such as glass ceramics, magnetic ceramics, or the like can be used as the insulating substrate (ceramic substrate) 10. In the present preferred embodiment, the insulating substrate 10 includes a substrate on an upper side of the hollow cavity portion 30 and a substrate on a lower side of the hollow cavity portion 30. The substrate on the upper side of the hollow cavity portion 30 and the substrate on the lower side of the hollow cavity portion 30 may each be defined by a single layer or may be defined by a plurality of layers. In the case where the substrate on the upper side of the hollow cavity portion 30 and/or the substrate on the lower side of the hollow cavity portion 30 include a plurality of layers, the respective layers may have the same compositions, or may have different compositions. Additionally, in the present preferred embodiment, an insulating substrate made from a resin or the like (a resin substrate) may be used as the insulating substrate 10 instead of a ceramic substrate.

The first discharge electrode 41 and the second discharge electrode 42 are in contact with the insulating substrate 10. In the present preferred embodiment, the first discharge electrode 41 and the second discharge electrode 42 are disposed within the insulating substrate 10. The first discharge electrode 41 and the second discharge electrode 42 are separated from each other and opposing each other. In the present preferred embodiment, the first discharge electrode 41 and the second discharge electrode 42 are separated from each other and opposing each other in the hollow cavity portion 30 provided within the insulating substrate 10. In the ESD protection device 1 illustrated in FIG. 1, the first discharge electrode 41 and the second discharge electrode 42 are disposed so that end portions on the sides thereof that oppose each other are arranged along an inner side of the hollow cavity portion 30. Although the present specification describes the ESD protection device 1, which includes the pair of discharge electrodes 40 including the first discharge electrode 41 and the second discharge electrode 42, as an example, the ESD protection device according to the present preferred embodiment may include two or more pairs of discharge electrodes. In the case where the ESD protection device according to the present preferred embodiment includes two or more pairs of discharge electrodes, additional hollow cavity portions and discharge auxiliary electrodes can be provided as appropriate corresponding to the respective discharge electrode pairs.

Figure 3:
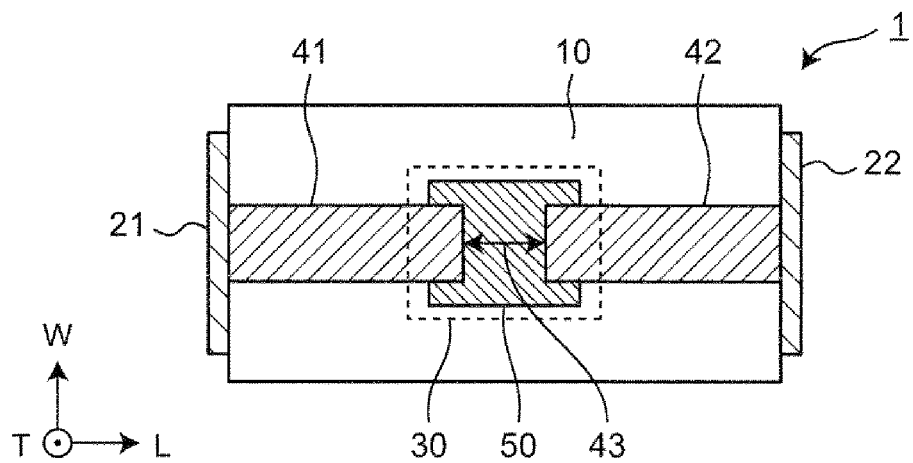
FIG. 3 is a schematic plan view illustrating an arrangement of discharge electrodes in the ESD protection device according to the first preferred embodiment of the present invention.

FIG. 3 is a cross-sectional view of the ESD protection device 1 taken from an A-A line in FIG. 1, and schematically illustrates an example of the arrangement of the discharge electrodes in the ESD protection device. In the arrangement illustrated in FIG. 3, the first discharge electrode 41 and the second discharge electrode 42 are disposed so that one end surfaces thereof are separated from each other and opposing each other. In the present specification, a "distance between discharge electrodes" refers to a minimum distance between the first discharge electrode and the second discharge electrode in a plane where the discharge electrodes and the discharge auxiliary electrode make contact. In the arrangement illustrated in FIG. 3, a distance between discharge electrodes 43 refers to a distance between the end surfaces of the first discharge electrode 41 and the second discharge electrode 42 that oppose each other. However, the arrangement of the discharge electrodes in the ESD protection device according to the present preferred embodiment is not limited to the arrangement illustrated in FIGS. 1 and 3, and can be changed as appropriate depending on the application.

Figure 4:
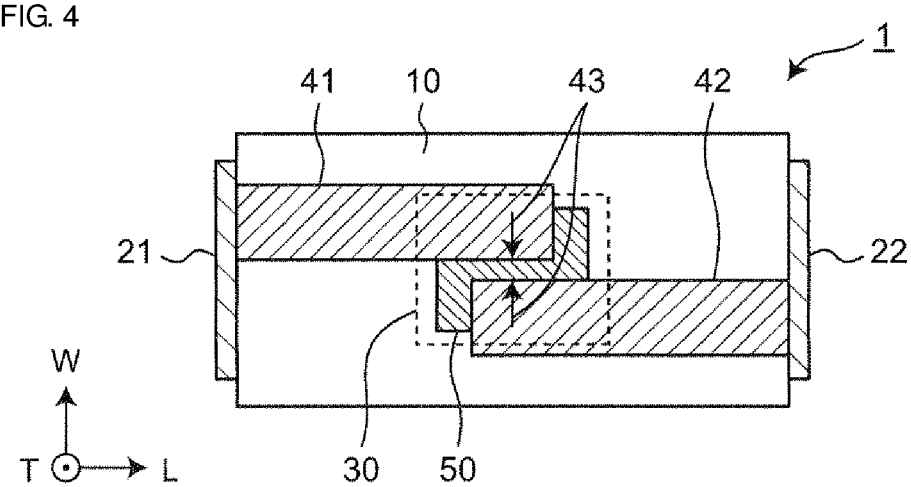
FIG. 4 is a schematic plan view illustrating a first variation on the arrangement of discharge electrodes in the ESD protection device according to the first preferred embodiment of the present invention.

FIG. 4 illustrates a first variation on the arrangement of the discharge electrodes in the ESD protection device according to the present preferred embodiment. Like FIG. 3, FIG. 4 schematically illustrates the arrangement of the discharge electrodes in a cross-section orthogonal or substantially orthogonal to the thickness direction (that is, in the LW plane). In the arrangement illustrated in FIG. 4, the first discharge electrode 41 and the second discharge electrode 42 are arranged parallel or substantially parallel to each other in the LW plane, with a portion of one side surface of the first discharge electrode and a portion of one side surface of the second discharge electrode 42 separated from each other and opposing each other. In the arrangement illustrated in FIG. 4, the distance between discharge electrodes 43 refers to a distance between the side surfaces of the first discharge electrode 41 and the second discharge electrode 42 that oppose each other.

Figure 5:
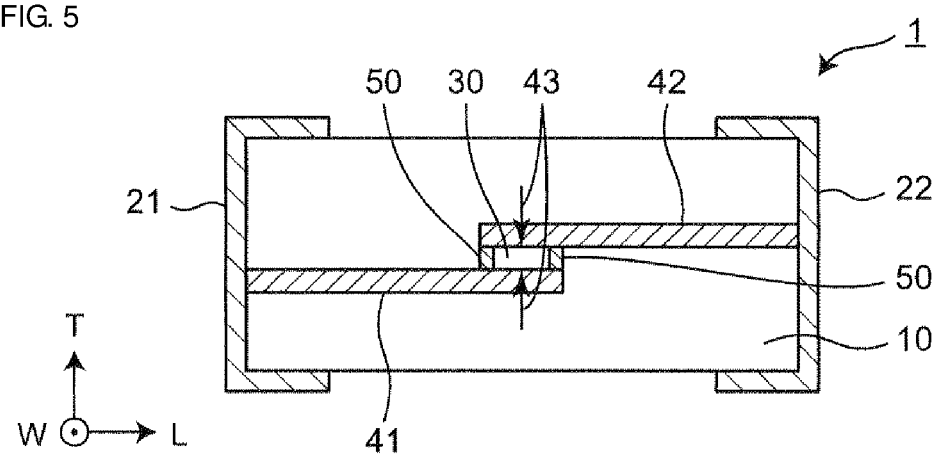
FIG. 5 is a schematic cross-sectional view illustrating a second variation on the arrangement of discharge electrodes in the ESD protection device according to the first preferred embodiment of the present invention.

FIG. 5 illustrates a second variation on the arrangement of the discharge electrodes in the ESD protection device according to the present preferred embodiment. Like FIG. 1, FIG. 5 schematically illustrates the arrangement of the discharge electrodes in a cross-section orthogonal or substantially orthogonal to the width direction (that is, in the LT plane). In the arrangement illustrated in FIG. 5, the first discharge electrode 41 and the second discharge electrode 42 are arranged parallel or substantially parallel to each other in the LT plane, with a portion of a top surface of the first discharge electrode and a portion of a bottom surface of the second discharge electrode 42 separated from each other and opposing each other. In the arrangement illustrated in FIG. 5, the distance between discharge electrodes 43 refers to a distance between the top surface of the first discharge electrode 41 and the bottom surface of the second discharge electrode 42 at the portions of the discharge electrodes that oppose each other.

It is preferable that the distance between discharge electrodes 43 at the region where the first discharge electrode 41 and the second discharge electrode 42 oppose each other be about 10 μm to about 50 μm. The distance between discharge electrodes 43 being greater than or equal to about 10 μm makes it possible to favorably employ a discharge electrode paste in the case where such a discharge electrode paste is used through screen printing, as will be described later. The distance between discharge electrodes 43 being less than or equal to about 50 μm makes it possible to further improve a discharge rate at about 2 kV, for example. Thus setting the distance between discharge electrodes to be within the above-described range makes it possible to obtain an ESD protection element having favorable ESD protection characteristics.

Although the compositions of the first discharge electrode 41 and the second discharge electrode 42 are not particularly limited, the electrodes may contain Cu, Ni, Ag, Pd, an alloy thereof, or a combination of these, for example.

The hollow cavity portion 30 is provided within the insulating substrate 10. The dimensions and shape of the hollow cavity portion 30 are not particularly limited as long as the first discharge electrode 41 and the second discharge electrode 42 are disposed within the hollow cavity portion 30 so as to be separated from each other and opposing each other. For example, in addition to a shape such as that illustrated in FIG. 1, in which an upper portion of the hollow cavity portion is curved, a shape such as a rectangle, a cylinder, or the like can be selected as appropriate.

It is preferable that the hollow cavity portion 30 contain a noble gas such as Ne, Ar, or the like. A noble gas ionizes easily, and thus a greater amount of gas ions is able to be produced. A surface discharge is able to be produced even more effectively as a result, which makes it possible to improve the operation rate at a comparatively low discharge voltage (about 2 kV, for example) even more. It is further preferable that the hollow cavity portion 30 contain Ar as the noble gas. Among noble gases, Ar ionizes comparatively easy and is comparatively cheap, which makes it possible to obtain an ESD protection device having favorable ESD protection characteristics at a lower cost. The abundance of noble gas in the hollow cavity portion 30 can be adjusted as appropriate to an amount that enables surface discharges to be induced effectively.

The first outer electrode 21 and the second outer electrode 22 are provided on an outside surface of the insulating substrate 10. The first outer electrode 21 is electrically connected to the first discharge electrode 41, and the second outer electrode 22 is electrically connected to the second discharge electrode 42. Although the compositions of the first outer electrode 21 and the second outer electrode 22 are not particularly limited, the electrodes may contain Cu, Ag, Pd, Ni, an alloy thereof, or a combination of these, for example. The metal material may be in particle form, and the particles may be spherical, flat, or a combination thereof, for example. In addition to the metal material, a glass material may be added to the first outer electrode 21 and the second outer electrode 22. One type of glass material may be used alone, or a combination of glass materials having different softening points may be used.

The discharge auxiliary electrode 50 spans the first discharge electrode 41 and the second discharge electrode 42 in a region where the first discharge electrode 41 and the second discharge electrode 42 oppose each other. The discharge auxiliary electrode 50 includes at least semiconductor particles and metal particles. The metal particles and the semiconductor particles are each dispersed throughout the discharge auxiliary electrode 50, and the discharge auxiliary electrode 50 as a whole is insulating. In the preferred embodiment illustrated in FIG. 1, the discharge auxiliary electrode 50 is arranged along an inner surface of the hollow cavity portion 30, and makes partial contact with the first discharge electrode 41 and the second discharge electrode 42.

The metal particles contained in the discharge auxiliary electrode 50 have an average particle diameter of about 0.3 μm to about 1.5 μm, for example. As will be described later, an average particle diameter of greater than or equal to about 0.10 μm for the metal particles of the raw material allows for easier handling and is thus preferable. Although this does depend on conditions as well, using metal particles including an average particle diameter of greater than or equal to about 0.10 μm as the metal particles of the raw material normally makes it possible for the average particle diameter of the metal particles in the obtained ESD protection device to be greater than or equal to about 0.3 μm, for example. An average particle diameter of less than or equal to about 1.5 μm makes it possible to achieve favorable initial insulation properties and a favorable operation rate at a comparatively low voltage (about 2 kV, for example). It is preferable that the average particle diameter of the metal particles be about 0.3 μm to about 0.66 μm, for example. An average particle diameter of less than or equal to about 0.66 μm makes it possible to further improve the initial insulation properties and operation rate at a comparatively low voltage (about 2 kV, for example). The average particle diameter of the metal particles included in the discharge auxiliary electrode 50 can be determined by, for example, capturing a scanning electron microscope (SEM) image (reflection electron image) of a cross-section of the discharge auxiliary electrode, measuring the lengths of long sides of the metal particles in the obtained image for which the entire particle can be seen, and then calculating an average value of the measured lengths of the long sides.

The density of the metal particles in a random cross-section of the discharge auxiliary electrode 50 preferably is greater than or equal to about 20 particles/50 μm$^2$, for example. A density of greater than or equal to about 20 particles/50 μm$^2$ makes it possible to achieve a favorable operation rate at a comparatively low voltage (about 2 kV, for example). It is preferable that the density of the metal particles be about 55 to about 170 particles/50 μm$^2$, for example. A density of greater than or equal to about 55 particles/50 μm$^2$ makes it possible to achieve an even more favorable operation rate at a comparatively low voltage (about 2 kV, for example). Although a higher density of metal particles tends to improve the characteristics of the obtained ESD protection device, a density of less than or equal to about 170 metal particles/50 μm$^2$ is enough to achieve favorable initial insulation properties and a favorable operation rate at about 2 kV, for example. In the present specification, the density of the metal particles in a random cross-section of the discharge auxiliary electrode 50 can be determined by, for example, capturing an SEM image (reflection electron image) of a cross-section of the discharge auxiliary electrode 50 and, in the obtained image, counting the total number of metal particles present within an approximately 50 μm$^2$ surface area range of the discharge auxiliary electrode 50. However, the density unit "particles/50 μm$^2$" is not intended to limit the surface area of the range in which the total number of metal particles is counted to about 50 μm$^2$. The density of the metal particles may be calculated on the basis of the total number of metal particles counted within an arbitrary surface area range in an arbitrary cross-section of the discharge auxiliary electrode 50.

The metal particles contained in the discharge auxiliary electrode 50 are not particularly limited, and may be particles including at least one metal selected from a group consisting of Cu, Ag, Pd, Pt, Al, Ni, W, and Mo, and/or an alloy thereof, for example. A single type of metal particle may be used alone or a plurality of types of metal particles may be used in combination in the discharge auxiliary electrode 50. It is preferable that the metal particles be Cu particles. Cu is cheap, and also has a low work function, and is therefore able to effectively generate surface discharges. Accordingly, using Cu particles as the metal particles makes it possible to obtain an ESD protection device having superior ESD protection characteristics at a low cost. Note that in the present specification, the metal particles "being Cu particles", for example, means that Cu is the primary component of the metal particles, and means that the metal particles include a Cu content of greater than or equal to about 90 wt %, for example. The constituent components of the metal particles can be determined through TEM-EDX (energy-dispersive X-ray spectroscopy), for example.

The semiconductor particles contained in the discharge auxiliary electrode 50 include, on their surfaces, an oxygen-containing layer. The semiconductor particles including an oxygen-containing layer on their surfaces makes it possible to significantly reduced or prevent a drop in the resistance value of the ESD protection device after ESD application, which in turn makes it possible to obtain an ESD protection device having superior repetition resistance. It is preferable that an average thickness of the oxygen-containing layer be about 10 nm to about 150 nm, for example. The average thickness of the oxygen-containing layer being greater than or equal to about 10 nm makes it possible to more effectively significantly reduce or prevent a drop in the resistance value of the ESD protection device after ESD application. On the other hand, the average thickness of the oxygen-containing layer being less than or equal to about 150 nm makes it possible to further improve the operation rate at a comparatively low voltage (about 2 kV, for example) while effectively reducing or preventing a drop in the resistance value of the ESD protection device after ESD application. The oxygen-containing layer need not completely cover the surfaces of the semiconductor particle, and may be formed on at least a portion of each semiconductor particle. However, the greater the range of the surfaces of the semiconductor particles covered by the oxygen-containing layer, the more effectively the drop in the resistance value after ESD application is able to be reduced or prevented.

The oxygen-containing layer present on the surfaces of the semiconductor particles contained in the discharge auxiliary electrode 50, and the average thickness thereof, is able to be measured through element mapping using a combination of a transmission electron microscope (TEM) and a wavelength dispersive X-ray analyzer (WDX), for example, but the measurement is not limited to this method.

The semiconductor particles contained in the discharge auxiliary electrode 50 are not particularly limited, and may, for example, be at least one type of particle selected from a group consisting of metal semiconductors such as Si and Ge, carbides such as SiC, TiC, ZrC, $Mo_2C$, and WC, nitrides such as TiN, ZrN, CrN, VN, and TaN, silicides such as $TiSi_2$, $ZrSi_2$, $WSi_2$, $MoSi_2$, and $CrSi_2$, borides such as $TiB_2$, $ZrB_2$, CrB, $LaB_6$, MoB, and WB, and oxides such as ZnO and $SrTiO_3$. A single type of semiconductor particle may be used alone or a plurality of types of semiconductor particles may be used in combination in the discharge auxiliary electrode 50. It is preferable that the semiconductor particles be SiC particles. SiC is cheap and has superior stability at high temperatures. Accordingly, using SiC particles as the semiconductor particles makes it possible to obtain, at a low cost, an ESD protection device having superior resistance to shorting when an ESD is applied. Additionally, in the case where SiC particles are used as the semiconductor particles, the SiC particles are able to act as electron receptors and donors, and the discharge start voltage of the surface discharge is thus able to be reduced even further. An ESD protection device that further improves the operation rate at a comparatively low voltage (about 2 kV, for example) is able to be obtained as a result. Note that in the present specification, the semiconductor particles "being SiC particles", for example, means that SiC is the primary component of the semiconductor particles, and means that the semiconductor particles include a SiC content of greater than or equal to about 90 wt %, for example. The constituent components of the semiconductor particles are able to be determined through TEM-EDX, for example.

As long as the oxygen-containing layer present on the surfaces of the semiconductor particles is a layer that contains oxygen and is insulating, the oxygen-containing layer is not particularly limited, and may be a layer containing an oxide of a metal element contained in the semiconductor particles, for example. Specifically, in the case where the semiconductor particles are SiC particles, the oxygen-containing layer may be a layer containing $SiO_2$. In the case where the oxygen-containing layer includes an oxide of the metal element, the oxygen-containing layer may include a single type of metal oxide, or may include two or more types of metal oxide.

It is preferable that the discharge auxiliary electrode also includes insulating particles. In the case where the discharge auxiliary electrode 50 includes insulating particles, sintering of the metal particles is able to be significantly reduced or prevented during firing, which makes it possible to obtain an ESD protection device having a higher operation rate at a comparatively low voltage (about 2 kV, for example). Additionally, in the case where the discharge auxiliary electrode includes insulating particles, the sintering together of semiconductor particles is able to be significantly reduced or prevented during firing, and the sintering together of semiconductor particles is able to be significantly reduced or prevented when an ESD is applied as well. This makes it possible to obtain an ESD protection device having a higher operation rate at a comparatively low voltage (about 2 kV, for example) and superior resistance to shorting when an ESD is applied.

The insulating particles are not particularly limited, and for example, at least one type of particle selected from a group consisting of $Al_2O_3$, $TiO_2$, $ZrO_2$, $SiO_2$, and the like may be used. A single type of insulating particle may be used alone or a plurality of types of insulating particles may be used in combination in the discharge auxiliary electrode 50. The insulating particles may be $Al_2O_3$ particles, for example. $Al_2O_3$ is cheap, and thus the ESD protection device is able to be obtained at a low cost. Additionally, in the case where the semiconductor particles are SiC particles and the metal particles are Cu particles, the Cu component will diffuse into an $SiO_2$ film present on the surface of the SiC particles, causing the viscosity of the $SiO_2$ film to drop and making it easier to sinter the Cu particles and/or the SiC particles during firing. On the other hand, in the case where the discharge auxiliary electrode 50 includes $Al_2O_3$ particles as the insulating particles, the Cu component diffusing into the $SiO_2$ film present on the surface of the SiC particles is able to be significantly reduced or prevented, which makes it possible to prevent the viscosity of the $SiO_2$ film from dropping. Sintering of the semiconductor particles (SiC particles) and/or the metal particles (Cu particles) is able to be significantly reduced or prevented effectively as a result, which makes it possible to obtain an ESD protection device having superior ESD protection characteristics. Note that in the present specification, the insulating particles "being $Al_2O_3$ particles", for example, means that $Al_2O_3$ is the primary component of the insulating particles, and means that the insulating particles include an $Al_2O_3$ content of greater than or equal to about 90 wt %, for example. The constituent components of the insulating particles can be determined through TEM-EDX (energy-dispersive X-ray spectroscopy), for example.

The constituent components of the discharge auxiliary electrode can be identified through microfocus X-ray analysis, for example.

Second Preferred Embodiment

Figure 6:
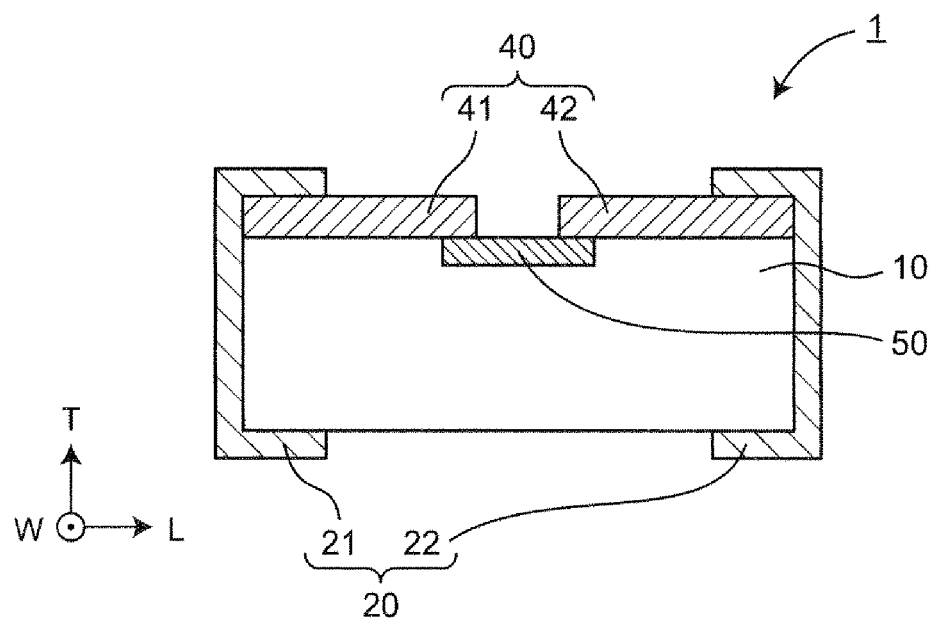
FIG. 6 is a schematic cross-sectional view of the configuration of an ESD protection device according to a second preferred embodiment of the present invention.

An ESD protection device according to a second preferred embodiment of the present invention will be described hereinafter with reference to FIG. 6. FIG. 6 is a schematic cross-sectional view of the configuration of an ESD protection device 1 according to the second preferred embodiment of the present invention. The ESD protection device 1 illustrated in FIG. 6 includes the insulating substrate 10, the first discharge electrode 41 and the second discharge electrode 42 in contact with the insulating substrate 10, the first outer electrode 21 and the second outer electrode 22 provided on an outside surface of the insulating substrate 10, and the discharge auxiliary electrode 50 extending across the first discharge electrode 41 and the second discharge electrode 42 in a region where the first discharge electrode 41 and the second discharge electrode 42 oppose each other. In the ESD protection device 1 according to the present preferred embodiment, the first discharge electrode 41 and the second discharge electrode 42 are disposed on an outside surface of the insulating substrate 10. The second preferred embodiment will be described hereinafter focusing on the differences from the first preferred embodiment, and unless otherwise stated, the descriptions given in the first preferred embodiment will apply.

In the present preferred embodiment, the discharge electrodes 40 are disposed on an outside surface of the insulating substrate 10. Like the arrangement described in the first preferred embodiment and illustrated in FIG. 3, the first discharge electrode 41 and the second discharge electrode 42 are disposed, in the ESD protection device 1 illustrated in FIG. 6, so that one end surface of the first discharge electrode 41 and one end surface of the second discharge electrode 42 are separated from each other and oppose each other. However, the arrangement of the discharge electrodes in the ESD protection device according to the present preferred embodiment is not limited to such an arrangement, and can be changed as appropriate depending on the application. For example, like the arrangement described in the first preferred embodiment and illustrated in FIG. 4, the first discharge electrode 41 and the second discharge electrode 42 may be arranged so that the first discharge electrode 41 and the second discharge electrode 42 are parallel or substantially parallel to each other in the LW plane, with a portion of one side surface of the first discharge electrode 41 and a portion of one side surface of the second discharge electrode 42 separated from each other and opposing each other. Although the present specification describes the ESD protection device 1, which includes the pair of discharge electrodes 40 including the first discharge electrode 41 and the second discharge electrode 42, as an example, the ESD protection device according to the present preferred embodiment may include two or more pairs of discharge electrodes. In the case where the ESD protection device according to the present preferred embodiment includes two or more pairs of discharge electrodes, additional discharge auxiliary electrodes can be provided as appropriate corresponding to the respective discharge electrode pairs. Furthermore, an ESD protection device according to a preferred embodiment of the present invention may have a configuration that combines at least one pair of discharge electrodes disposed within the insulating substrate with at least one pair of discharge electrodes disposed on an outside surface of the insulating substrate.

Figure 7:
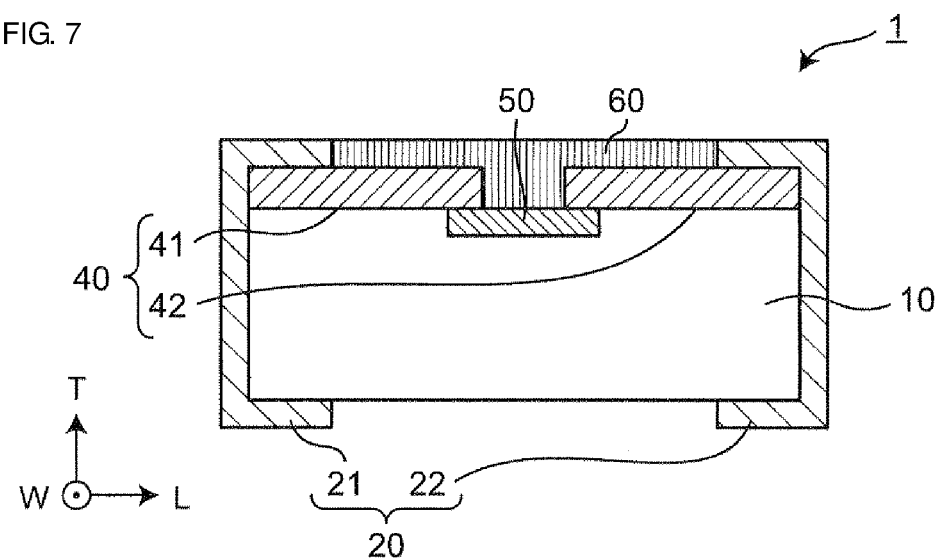
FIG. 7 is a schematic cross-sectional view illustrating a first variation on the configuration of the ESD protection device according to the second preferred embodiment of the present invention.

A first variation on the ESD protection device according to the present preferred embodiment is illustrated in FIG. 7. As illustrated in FIG. 7, the ESD protection device 1 may further include a resin layer 60 disposed upon the first discharge electrode 41, the second discharge electrode 42, and the discharge auxiliary electrode 50. The resin layer 60 improves the reliability of the ESD protection device by preventing degradation such as oxidization of the discharge electrodes 40 and/or the discharge auxiliary electrode 50 due to the influence of the surrounding environment.

Figure 8:
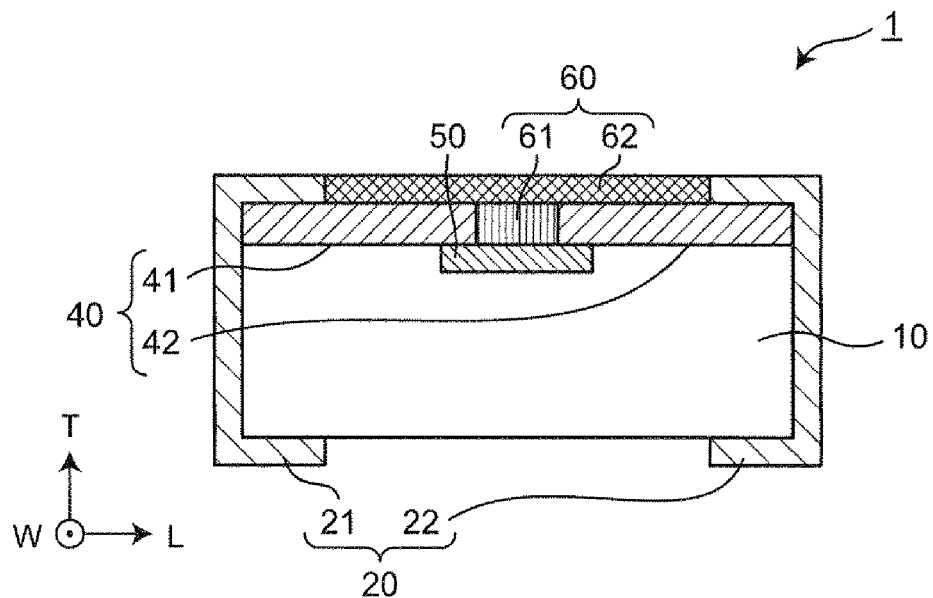
FIG. 8 is a schematic cross-sectional view illustrating a second variation on the configuration of the ESD protection device according to the second preferred embodiment of the present invention.

The resin layer 60 may include a single layer as illustrated in FIG. 7, but may also include two or more different layers. FIG. 8 illustrates a second variation on the ESD protection device according to the present preferred embodiment. In this variation, the resin layer 60 includes a first resin layer and a second resin layer 62. The first resin layer 61 is disposed in a region where the first discharge electrode 41 and the second discharge electrode 42 oppose each other, and the second resin layer 62 is disposed upon the first resin layer 61.

Figure 9:
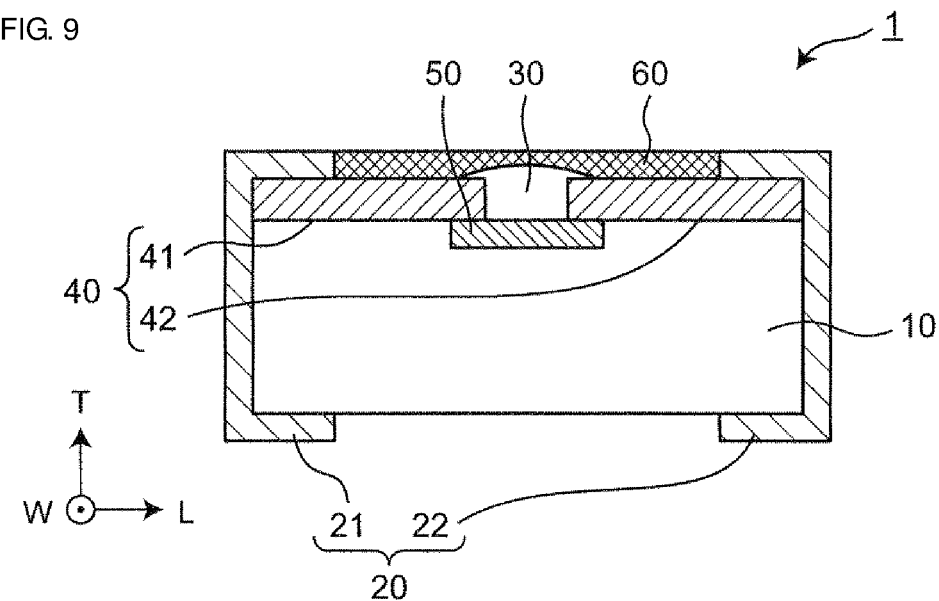
FIG. 9 is a schematic cross-sectional view illustrating a third variation on the configuration of the ESD protection device according to the second preferred embodiment of the present invention.

FIG. 9 illustrates a third variation on the ESD protection device according to the present preferred embodiment. The ESD protection device 1 illustrated in FIG. 9 further includes the resin layer 60 disposed upon the first discharge electrode 41 and the second discharge electrode 42, and the hollow cavity portion 30 in the resin layer 60; the first discharge electrode 41 and the second discharge electrode 42 are separated from each other and opposing each other within the hollow cavity portion 30. The dimensions and shape of the hollow cavity portion 30 are not particularly limited as long as the first discharge electrode 41 and the second discharge electrode 42 are disposed within the hollow cavity portion 30 so as to be separated from each other and opposing each other. For example, in addition to a shape such as that illustrated in FIG. 9, in which an upper part of the hollow cavity portion is curved, a shape such as a rectangle, a cylinder, or the like can be selected as appropriate. It is preferable that the hollow cavity portion 30 contain a noble gas such as Ne, Ar, or the like. A noble gas ionizes easily, and thus a greater amount of gas ions is produced. A surface discharge is able to be produced even more effectively as a result, which makes it possible to improve the operation rate at a comparatively low discharge voltage (about 2 kV, for example) even more. It is further preferable that the hollow cavity portion 30 contain Ar as the noble gas. Among noble gases, Ar ionizes comparatively easy and is comparatively cheap, which makes it possible to obtain an ESD protection device having favorable ESD protection characteristics at a lower cost.

Method of Manufacturing ESD Protection Device According to First Preferred Embodiment An example of a method of manufacturing the ESD protection device according to the first preferred embodiment of the present invention will be described hereinafter, but the present invention is not intended to be limited to the method described hereinafter. The method of manufacturing the ESD protection device according to the present preferred embodiment includes at least steps A to G described hereinafter.

Step A

Step A is a step of forming an unfired discharge auxiliary electrode by applying a discharge auxiliary electrode paste containing metal particles, semiconductor particles, and an organic vehicle to one main surface of a first ceramic green sheet.

Preparation of Ceramic Green Sheet

A ceramic green sheet for forming a ceramic substrate can be prepared through the following procedure. A ceramic material is mixed with an organic carrier such as toluene or Ekinen; a binder, plasticizer, and the like are added to the mixture, which is then mixed further; and a slurry is obtained. This slurry is shaped using the doctor blade method or the like to obtain a ceramic green sheet having a predetermined thickness. A ceramic material containing Ba, Al, and Si as primary components (BAS) can be used as the ceramic material, for example.

Preparation of Discharge Auxiliary Electrode Paste

The discharge auxiliary electrode paste for forming the discharge auxiliary electrode can be prepared through the following procedure. The discharge auxiliary electrode paste is prepared by blending semiconductor particles, metal particles, an organic vehicle obtained by dissolving a binder such as ethyl cellulose in an organic carrier such as terpineol, and depending on the case a dispersant for the semiconductor particles and the metal particles at a predetermined ratio, and then mixing using a three-roll mill or the like.

The metal particles used in the discharge auxiliary electrode paste (also called "raw material metal particles") have an average particle diameter of about 0.10 μm to about 1.00 μm. An average particle diameter of greater than or equal to about 0.10 μm allows for easier handling, and also makes it possible to significantly reduce or prevent oxidization, which is undesirable for metal particles. An average particle diameter of less than or equal to about 1.00 μm makes it possible for the average particle diameter and density of the metal particles contained in the discharge auxiliary electrode of the obtained ESD protection device to be within the above-described suitable numerical value range, which makes it possible to obtain an ESD protection device having superior ESD protection characteristics. Note that the average particle diameter of the metal particles contained in the discharge auxiliary electrode of the obtained ESD protection device tends to increase as the average particle diameter of the raw material metal elements increases. The average particle diameter of the raw material metal particles can be determined by, for example, capturing an SEM image of the metal particles, drawing a single diagonal line from an apex of the obtained image, measuring the length of a long side of all metal particles intersecting with the diagonal line, and calculating an average value of the measured lengths of the long sides.

The volume fraction of metal particles relative to all non-combustive components contained in the discharge auxiliary electrode paste is about 15 vol % to about 40 vol %. In the present specification, "non-combustive components" refers to, of the components contained in the discharge auxiliary electrode paste, components that are not lost as gas through vaporization, combustion, or the like in the firing carried out in step E and that therefore constitute the discharge auxiliary electrode in the obtained ESD protection device. For example, in the case where the discharge auxiliary electrode paste contains only metal particles, semiconductor particles, and an organic vehicle, the "non-combustive components" are the metal particles and the semiconductor particles. In the case where the discharge auxiliary electrode paste contains insulating particles (mentioned later) in addition to metal particles, semiconductor particles, and an organic vehicle, the "non-combustive components" are the metal particles, the semiconductor particles, and the insulating particles. The volume fraction of metal particles relative to all non-combustive components being greater than or equal to about 15 vol % makes it possible to obtain an ESD protection device having a superior operation rate at a comparatively low voltage (about 2 kV, for example). The volume fraction of metal particles relative to all non-combustive components being less than or equal to about vol % makes it possible to significantly reduce or prevent sintering between the metal particles in step E, which makes it possible to obtain an ESD protection device having superior ESD protection characteristics. It is preferable that the volume fraction of metal particles relative to all non-combustive components be about 30 vol % to about 40 vol %. A volume fraction of greater than or equal to about 30 vol % makes it possible to achieve an even more favorable operation rate for the ESD protection device at a comparatively low voltage (about 2 kV, for example).

The raw material metal particles are not particularly limited, and may be particles including at least one metal selected from a group consisting of Cu, Ag, Pd, Pt, Al, Ni, W, and Mo, and/or an alloy thereof, for example. A single type of metal particle may be used alone or a plurality of types of metal particles may be used in combination as the raw material metal particles. It is preferable that the raw material metal particles be Cu particles. When the raw material metal particles are Cu particles, it is possible to obtain an ESD protection device having superior ESD protection characteristics at a low cost. Note that in the present specification, the "raw material metal particles being Cu particles", for example, means that Cu is the primary component of the raw material metal particles, and specifically means that the raw material metal particles include a Cu content of greater than or equal to about 90 wt %. The composition of the raw material metal particles can be identified through, for example, inductively coupled plasma atomic emission spectroscopy (ICP-AES) and inert gas fusion using an oxygen/nitrogen analyzer.

The semiconductor particles used in the discharge auxiliary electrode paste (also called "raw material semiconductor particles") contain an oxygen-containing layer on their surfaces. Using semiconductor particles including an oxygen-containing layer on their surfaces as the raw material makes it possible to obtain an ESD protection device including a discharge auxiliary electrode that contains semiconductor particles including an oxygen-containing layer on their surfaces. Note that the oxygen-containing layer need not cover the entire surface of each raw material semiconductor particle, and may be present on at least a portion of the surface of each particle. However, the greater the range of the surfaces of the raw material semiconductor particles covered by the oxygen-containing layer, the more effectively the drop in the resistance value after ESD application is significantly reduced or prevented in the resulting ESD protection device. The raw material semiconductor particles contain oxygen (oxygen element) at about 1.0 wt % to about 7.0 wt %. The oxygen content being greater than or equal to about 1.0 wt % makes it possible to obtain an ESD protection device capable of even more effectively reducing or preventing a drop in the resistance value after ESD application. On the other hand, the oxygen content being less than or equal to about 7.0 wt % makes it possible to obtain an ESD protection device that is both capable of effectively reducing or preventing a drop in the resistance value after ESD application and further improves the operation rate at a comparatively low voltage (about 2 kV, for example). The oxygen content of the raw material semiconductor particles can be identified by subjecting the semiconductor particles to impulse heated fusion and using the infrared absorption technique to measure the gas produced, for example.

The composition of the oxygen-containing layer present on the surfaces of the raw material semiconductor particle is not particularly limited, but may contain an oxide of a metal element defining the semiconductor particle, for example. For example, in the case where the raw material semiconductor particles are SiC particles, the oxygen-containing layer may contain $SiO_2$. In the case where the oxygen-containing layer contains an oxide, it is preferable that the ratio of the weight of the oxide contained in the oxygen-containing layer to the overall weight of the semiconductor particles be about 1.0 wt % to about 12.0 wt %. The weight ratio of the oxide being greater than or equal to about 1.0 wt % makes it possible to obtain an ESD protection device capable of even more effectively reducing or preventing a drop in the resistance value after ESD application. On the other hand, the weight ratio of the oxide being less than or equal to about 12.0 wt % makes it possible to obtain an ESD protection device that is both capable of effectively reducing or preventing a drop in the resistance value after ESD application and further improves the operation rate at a comparatively low voltage (about 2 kV, for example). Note that the "overall weight of the semiconductor particles" referred to here is a value including the weight of the oxide present on the surfaces of the semiconductor particles. For example, in the case where the raw material semiconductor particles are SiC particles and the oxygen-containing layer present on the surfaces of the SiC particles contains $SiO_2$, it is preferable that the ratio of the weight of the $SiO_2$ contained in the oxygen-containing layer to the overall weight of the semiconductor particles be about 1.6 wt % to about 10.2 wt %. The weight ratio of the oxide contained in the oxygen-containing layer can be determined as appropriate using a known method. For example, in the case where the oxygen-containing layer contains $SiO_2$, the weight ratio of the $SiO_2$ contained in the oxygen-containing layer (that is, the $SiO_2$ present on the surfaces of the semiconductor particles) can be determined according to the JIS R6124 standard.

It is preferable that the specific surface area of the semiconductor particles used in the discharge auxiliary electrode paste (also called "raw material semiconductor particles") be greater than or equal to about 3 $m^2/g$. The specific surface area being greater than or equal to about 3 $m^2/g$ makes it possible for the obtained ESD protection device to even more effectively generate a surface discharge, which in turn makes it possible to improve the operation rate of the ESD protection device at a comparatively low voltage (about 2 kV, for example). It is further preferable that the specific surface area of the raw material semiconductor particles be about 7 $m^2/g$ to about 15 $m^2/g$. Setting the specific surface area to be greater than or equal to about 7 $m^2/g$ makes it possible to reduce variations in the ESD protection characteristics. Setting the specific surface area to be less than or equal to about 15 $m^2/g$ makes it easy to disperse the raw material semiconductor particles uniformly throughout the discharge auxiliary electrode paste, which makes it possible to effectively significantly reduce or prevent variations in the ESD protection characteristics. The specific surface area of the semiconductor particles can be measured through, for example, singlepoint BET using nitrogen gas.

It is preferable that the raw material semiconductor particles be a pulverized product. In the case where the semiconductor particles are a pulverized product, the semiconductor particles include irregular shapes, with the surfaces of the particles including partially tapered shapes. The semiconductor particles including irregular shapes makes it easier for electrons to be released from the surfaces of the semiconductor particles, which makes it possible to more effectively produce a surface discharge. Accordingly, when the semiconductor particles are a pulverized product, an ESD protection device that further improves the operation rate at a comparatively low discharge voltage (about 2 kV, for example) is able to be obtained.

The raw material semiconductor particles are not particularly limited, and may, for example, be at least one type of particle selected from a group consisting of metal semiconductors such as Si and Ge, carbides such as SiC, TiC, ZrC, $Mo_2C$, and WC, nitrides such as TiN, ZrN, CrN, VN, and TaN, silicides such as $TiSi_2$, $ZrSi_2$, $WSi_2$, $MoSi_2$, and $CrSi_2$, borides such as $TiB_2$, $ZrB_2$, CrB, $LaB_6$, MoB, and WB, and oxides such as ZnO and $SrTiO_3$. A single type of semiconductor particle may be used alone or a plurality of types of semiconductor particles may be used in combination as the raw material semiconductor particles. It is preferable that the raw material semiconductor particles be SiC particles. Using SiC particles as the semiconductor particles further improves the operation rate at a comparatively low voltage (about 2 kV, for example), and makes it possible to obtain, at a low cost, an ESD protection device having superior resistance to shorting when an ESD is applied. Note that in the present specification, the "raw material semiconductor particles being SiC particles", for example, means that SiC is the primary component of the raw material semiconductor particles, and specifically means that the raw material semiconductor particles include a SiC content of greater than or equal to about 90 wt %. The composition of the raw material semiconductor particles can be identified through a combination of qualitative analysis using an XRD (X-ray diffractometer), and ICP-AES and oxygen flow combustion high-frequency furnace-based infrared absorption using a carbon/sulfur analyzer, for example.

It is preferable that the discharge auxiliary electrode paste further includes insulating particles (also called "raw material insulating particles"). In the case where the discharge auxiliary electrode paste includes insulating particles, sintering of the metal particles is able to be significantly reduced or prevented during the firing of step E, which makes it possible to obtain an ESD protection device having a higher operation rate at a comparatively low voltage (about 2 kV, for example). Additionally, in the case where the discharge auxiliary electrode paste contains insulating particles, sintering of the semiconductor particles during the firing of step E is able to be significantly reduced or prevented, and sintering of the semiconductor particles during ESD application is able to be significantly reduced or prevented in the obtained ESD protection device. Accordingly, in the case where the discharge auxiliary electrode paste includes insulating particles, it is possible to obtain an ESD protection device having a higher operation rate at a comparatively low voltage (about 2 kV, for example) and having superior resistance to shorting when an ESD is applied. Note that even in the case where the discharge auxiliary electrode paste further contains insulating particles, it is preferable that the stated volume fraction of metal particles relative to all non-combustive components including metal particles, semiconductor particles, and insulating particles be about 15 vol % to about 40 vol %.

It is preferable that the specific surface area of the raw material insulating particles be greater than or equal to about 20 $m^2/g$. Setting the specific surface area to greater than or equal to about 20 $m^2/g$ provides a high effect of significantly reducing or preventing sintering of the metal particles and the semiconductor particles, and makes it possible to achieve the sintering suppression effect even in the case where a small amount of insulating particles is added. It is further preferable that the specific surface area of the raw material insulating particles be about 30 $m^2/g$ to about 60 $m^2/g$. Setting the specific surface area to greater than or equal to about 30 $m^2/g$ makes it possible to further significantly reduce or prevent sintering of the metal particles and the semiconductor particles, due to a small amount being added. Setting the specific surface area to be less than or equal to about 60 $m^2/g$ makes it easy to disperse the raw material insulating particles uniformly throughout the discharge auxiliary electrode paste, which makes it possible to more effectively significantly reduce or prevent variations in the ESD protection characteristics. The specific surface area of the insulating particles can be measured through, for example, singlepoint BET using nitrogen gas.

The raw material insulating particles may be at least one type of particle selected from a group consisting of $Al_2O_3$, $TiO_2$, $ZrO_2$, $SiO_2$, and the like. A single type of insulating particle may be used alone or a plurality of types of insulating particles may be used in combination as the raw material insulating particles. It is preferable that the raw material insulating particles be $Al_2O_3$ particles. When the raw material insulating particles are $Al_2O_3$ particles, it is possible to obtain an ESD protection device having superior ESD protection characteristics at a low cost. Note that in the present specification, the "raw material insulating particles being $Al_2O_3$ particles", for example, means that $Al_2O_3$ is the primary component of the raw material insulating particles, and specifically means that the raw material insulating particles include an $Al_2O_3$ content of greater than or equal to about 90 wt %. The composition of the raw material insulating particles can be identified through a combination of qualitative analysis using XRD, and ICP-AES, for example.

Application of Discharge Auxiliary Electrode Paste

The discharge auxiliary electrode paste is applied to the one main surface of the first ceramic green sheet in a predetermined pattern. The method of applying the discharge auxiliary electrode paste is not particularly limited, and a method such as screen printing can be selected as appropriate. The discharge auxiliary electrode paste applied to a ceramic green sheet will also be called an "unfired discharge auxiliary electrode" hereinafter.

Step B

Step B is a step of forming first and second unfired discharge electrodes by applying a discharge electrode paste to the first ceramic green sheet to which the discharge auxiliary electrode paste has been applied.
Preparation of Discharge Electrode Paste The discharge electrode paste for forming the discharge electrodes can be prepared through the following procedure. The discharge electrode paste is prepared by blending metal particles and/or alloy particles including a predetermined average particle diameter with an organic vehicle obtained by dissolving a binder such as ethyl cellulose in an organic carrier such as terpineol at a predetermined ratio, and then mixing using a three-roll mill or the like. For example, Cu, Ni, Ag, Pd, and alloy thereof, or a combination of any of these may be used as the metal particles and/or alloy particles, but the particles are not limited thereto.

Application of Discharge Electrode Paste

The discharge electrode paste is applied in a predetermined pattern to the first ceramic green sheet to which the discharge auxiliary electrode paste has been applied. Hereinafter, the discharge electrode paste applied to the ceramic green sheet will also be called "unfired discharge electrodes" or a "first unfired discharge electrode" and a "second unfired discharge electrode". The first and second unfired discharge electrodes are at least partially disposed upon the unfired discharge auxiliary electrode, and are separated from each other and opposing each other upon the unfired discharge auxiliary electrode. At this time, a gap between the first unfired discharge electrode and the second unfired discharge electrode can be adjusted as appropriate so that the distance between discharge electrodes is a desired value in the obtained ESD protection device. The method of applying the discharge electrode paste is not particularly limited, and a method such as screen printing can be selected as appropriate.

Step C

Step C is a step of applying a hollow cavity portion formation paste to the first ceramic green sheet to which the discharge auxiliary electrode paste and the discharge electrode paste have been applied.
Preparation of Hollow Cavity Portion Formation Paste The hollow cavity portion formation paste for forming the hollow cavity portion is prepared. A resin that breaks down and dissipates during firing can be used as the hollow cavity portion formation paste; for example, polyethylene terephthalate (PET), polypropylene, ethyl cellulose, an acrylic resin, or the like can be used. Specifically, the hollow cavity portion formation paste can be prepared, for example, by blending crosslinked acrylic resin beads having a predetermined average particle diameter with an organic vehicle obtained by dissolving a binder such as ethyl cellulose in an organic carrier such as terpineol at a predetermined ratio, and then mixing using a three-roll mill or the like.
Application of Hollow Cavity Portion Formation Paste The hollow cavity portion formation paste is applied in a predetermined pattern to the first ceramic green sheet to which the discharge auxiliary electrode paste and the discharge electrode paste have been applied. The hollow cavity portion formation paste is applied so as to cover at least the region where the first and second unfired discharge electrodes oppose each other. The method of applying the hollow cavity portion formation paste is not particularly limited, and a method such as screen printing can be selected as appropriate.

Note that in the case where the above-described discharge auxiliary electrode paste, discharge electrode paste, and hollow cavity portion formation paste are each applied at high thicknesses, the respective pastes may be applied so that a recess provided in advance in the first ceramic green sheet is sequentially filled by the respective pastes.

Step D

Step D is a step of forming an unfired multilayer body by stacking a second ceramic green sheet on the first ceramic green sheet to which the discharge auxiliary electrode paste, the discharge electrode paste, and the hollow cavity portion formation paste have been applied and shaping the ceramic green sheets to predetermined dimensions. The first ceramic green sheet and the second ceramic green sheet may be the same type of sheet or different types of sheets. One or more other ceramic green sheets may be stacked above and/or below the first and second ceramic green sheets stacked in this manner. In this case, each of the stacked ceramic green sheets may be the same type of sheet, but two or more different types of ceramic green sheets may be combined as appropriate. The multilayer body obtained in this manner (also called a mother multilayer body) is pressure bonded so that the overall thickness becomes a predetermined thickness. The pressure-bonded mother multilayer body is cut to predetermined dimensions using a microcutter or the like to obtain the unfired multilayer body.

Step E

Step E is a step of firing the unfired multilayer body to obtain a multilayer body including the insulating substrate, which is a ceramic substrate, the first and second discharge electrodes, the discharge auxiliary electrode, and the hollow cavity portion. The unfired multilayer body is fired at about 900° C. to about 1,000° C. for approximately 90 minutes in a predetermined atmosphere. The hollow cavity portion formation paste breaks down and vaporizes due to the firing, forming the hollow cavity portion as a result. The firing also breaks down and vaporizes the organic carrier and binder present in the ceramic green sheets and the respective pastes. It is preferable that step E be at least partially carried out in an atmosphere containing a noble gas such as Ne or Ar. Carrying out at least part of step E in an atmosphere containing a noble gas makes it possible to obtain an ESD protection device in which the noble gas is present within the hollow cavity portion. Among noble gases, Ar ionizes comparatively easily and is comparatively cheap, and thus it is preferable to use Ar as the noble gas.

Furthermore, it is preferable to carry out step E in an atmosphere containing $H_2$ and $H_2O$ in addition to the noble gas, while maintaining an oxygen partial pressure $P_{O2}$ at greater than or equal to an equilibrium oxygen partial pressure of C (carbon) and less than or equal to an equilibrium oxygen partial pressure of the metal particles contained in the discharge electrode paste and the discharge auxiliary electrode paste. Adjusting the atmosphere during firing in this manner makes it possible to induce the combustion of organic components present in the ceramic green sheet and the respective pastes while significantly reducing or preventing oxidization of the metal particles contained in the discharge electrode paste and the discharge auxiliary electrode paste.

Step F

Step F is a step of forming first and second unfired outer electrodes by applying an outer electrode paste to an outside surface of the fired multilayer body (chip).
Preparation of Outer Electrode Paste The outer electrode paste for forming the outer electrodes can be prepared through the following procedure. The outer electrode paste is prepared by blending Cu powder having a predetermined average particle diameter, borosilicate alkali glass frits having a predetermined transition point, softening point, and average particle diameter, and an organic vehicle obtained by dissolving a binder such as ethyl cellulose in an organic carrier such as terpineol at a predetermined ratio, and then mixing using a three-roll mill or the like.
Application of Outer Electrode Paste The outer electrode paste is applied to both end portions of the chip through spreading or the like. The outer electrode paste applied to the chip is also called "unfired outer electrodes" or a "first unfired outer electrode" and a "second unfired outer electrode". The first unfired outer electrode is formed so as to be in contact with the first discharge electrode, and the second unfired outer electrode is formed so as to be in contact with the second discharge electrode. By applying the outer electrode paste in this manner, the first outer electrode is able to be electrically connected to the first discharge electrode and the second outer electrode is able to be electrically connected to the second discharge electrode in the obtained ESD protection device.

Step G

Step G is a step of forming the first and second outer electrodes by subjecting the unfired first and second outer electrodes to a baking process. The baking conditions can be adjusted as appropriate in accordance with the composition of the outer electrode paste and the like. The surfaces of the outer electrodes that are formed may be subjected to electrolytic Ni—Sn plating or the like.

The ESD protection device obtained in this manner has favorable initial insulation properties and repetition resistance, and has a favorable operation rate at a comparatively low discharge voltage of about 2 kV.

Method of Manufacturing ESD Protection Device According to Second Preferred Embodiment A method of manufacturing the ESD protection device according to the second preferred embodiment of the present invention will be described next. The following will describe with focus on differences from the method of manufacturing the ESD protection device according to the first preferred embodiment, and unless otherwise stated, the descriptions given of the method of manufacturing the ESD protection device according to the first preferred embodiment will apply.

The discharge auxiliary electrode paste and the discharge electrode paste are applied to the first ceramic green sheet through the same procedures as in steps A and B in the method of manufacturing the ESD protection device according to the first preferred embodiment. The first ceramic green sheet may be include a single layer, or may include a plurality of layers. In the case where the first ceramic green sheet includes a plurality of layers, each layer may have the same composition, or the layers may have different compositions. A multilayer body obtained in this manner (a mother multilayer body) is pressure bonded so that the overall thickness becomes a predetermined thickness. The pressure-bonded mother multilayer body is cut to predetermined dimensions using a microcutter or the like to obtain the unfired multilayer body. This unfired multilayer body is then fired to obtain a multilayer body including the insulating substrate, which is a ceramic substrate, the first and second discharge electrodes, and the discharge auxiliary electrode. The outer electrodes are formed on an outside surface of this multilayer body (chip) through the same procedures as in the above-described steps F and G. The top of the multilayer body may then be covered with a resin layer using a known method.

Although the foregoing has described a method of manufacturing an ESD protection device including a single pair of discharge electrodes (the first and second discharge electrodes), an ESD protection device including two or more pairs of discharge electrodes can be manufactured as appropriate on the basis of the above-described manufacturing method.

Working Examples

With respect to the ESD protection device according to the first preferred embodiment of the present invention, Examples 1 to 21 of the ESD protection device were manufactured through the following procedures.

Preparation of Ceramic Green Sheet

Toluene and Ekinen (registered trademark) were added to a powder of a ceramic material containing Ba, Al, and Si as primary components (BAS), which were then mixed. A binder resin and a plasticizer were further added to this mixture and mixed to obtain a ceramic slurry. The ceramic slurry was shaped through the doctor blade method, and an approximately 50 μm-thick ceramic green sheet was obtained.

Preparation of Discharge Auxiliary Electrode Paste

The metal particles, semiconductor particles, insulating particles, and organic vehicles indicated in the following Table 1 were prepared.

TABLE 1

| METAL PARTICLES | PRIMARY COMPONENT | AVG. PARTICLE DIAMETER (μm) |
|---|---|---|
| M-1 | Cu | 0.10 |
| M-2 | Cu | 0.30 |
| M-3 | Cu | 1.00 |
| M-4 | Cu | 1.50 |

| SEMI-CONDUCTOR PARTICLES | PRIMARY COMPONENT | SPECIFIC SURFACE AREA ($m^2/g$) | OXYGEN CONTENT (WT %) | SURFACE $SiO_2$ AMOUNT (WT %) |
|---|---|---|---|---|
| S-1 | SiC | 15 | 0.6 | 0.3 |
| S-2 | SiC | 15 | 1.0 | 1.6 |
| S-3 | SiC | 15 | 2.5 | 3.2 |
| S-4 | SiC | 15 | 5.0 | 7.1 |
| S-5 | SiC | 15 | 7.0 | 10.2 |
| S-6 | SiC | 5 | 1.0 | 1.3 |

| INSULATING PARTICLES | PRIMARY COMPONENT | SPECIFIC SURFACE AREA ($m^2/g$) |
|---|---|---|
| I-1 | $Al_2O_3$ | 20 |

| ORGANIC VEHICLE | COMPOSITION (VOL %) | |
|---|---|---|
| | ETHYL CELLULOSE | TERPINEOL |
| V-1 | 12.75 | 87.25 |

The composition of the metal particles was analyzed through ICP-AES (inductively coupled plasma atomic emission spectroscopy) and inert gas fusion using an oxygen/nitrogen analyzer (Horiba, Ltd.), and it was confirmed that the Cu content was greater than or equal to about 90 wt %, or in other words, that Cu was the primary component of the metal particles.

The average particle diameter of the metal particles (Cu particles) was determined through the following procedure. First, an SEM image (10,000×) of the metal particles was captured, a single diagonal line was drawn from the apex of the obtained image, and the lengths of the long sides of all of the metal particles intersecting with the diagonal line were measured. This operation was carried out for five SEM images captured in different regions, and an average value of the measured lengths of the long sides of the metal particles was calculated. The average value determined in this manner was taken as the average particle diameter of the metal particles.

After confirming that SiC crystals were present through qualitative analysis using XRD (X-ray diffractometer), the composition of the semiconductor particles was analyzed through ICP-AES and oxygen flow combustion high-frequency furnace-based infrared absorption using a carbon/sulfur analyzer (Horiba, Ltd.), and an SiC content of greater than or equal to about 90 wt % was confirmed.

The oxygen content of the semiconductor particles was determined by subjecting the semiconductor particles to impulse heated fusion and using the infrared absorption technique to measure the gas produced. The ratio of the weight of the $SiO_2$ contained in the oxygen-containing layer (that is, the $SiO_2$ present on the surfaces of the semiconductor particles) to the overall weight of the semiconductor particles (called a "surface $SiO_2$ amount" hereinafter) was determined through acid-base titration according to the JIS R6124 standard.

After confirming that $Al_2O_3$ crystals were present through qualitative analysis using XRD, the composition of the insulating particles was analyzed through ICP-AES, and an $Al_2O_3$ content of greater than or equal to about 90 wt % was confirmed.

The specific surface areas of the semiconductor particles (SiC particles) and the insulating particles ($Al_2O_3$ particles) were measured through singlepoint BET using nitrogen gas.

Mixtures of the metal particles, semiconductor particles, insulating particles, and organic vehicle indicated in Table 1 were dispersed and mixed at the ratios indicated in the following Table 2 using a three-roll mill, and discharge auxiliary electrode pastes P-1 to P-17 were prepared.

TABLE 2

| NO. | METAL PARTICLES | COMPOSITION (VOL %) NON-COMBUSTIVE COMPONENTS | | | | | ORGANIC VEHICLE | | RATIO OF METAL PARTICLES IN NON-COMBUSTIVE COMPONENTS (VOL %) |
|---|---|---|---|---|---|---|---|---|---|
| | | | SEMICONDUCTOR PARTICLES | | INSULATING PARTICLES | | | | |
| P-1  | M-2 | 1.50 | S-3 | 13.50 | —   | —    | V-1 | 85.00 | 10 |
| P-2  | ↑   | 2.25 | ↑   | 12.75 | —   | —    | ↑   | 85.00 | 15 |
| P-3  | ↑   | 4.50 | ↑   | 10.50 | —   | —    | ↑   | 85.00 | 30 |
| P-4  | ↑   | 6.00 | ↑   | 9.00  | —   | —    | ↑   | 85.00 | 40 |
| P-5  | ↑   | 6.75 | ↑   | 8.25  | —   | —    | ↑   | 85.00 | 45 |
| P-6  | ↑   | 4.50 | ↑   | 9.75  | I-1 | 0.75 | ↑   | 85.00 | 30 |
| P-7  | ↑   | 4.50 | ↑   | 6.00  | ↑   | 4.50 | ↑   | 85.00 | 30 |
| P-8  | M-1 | 2.25 | ↑   | 12.75 | —   | —    | ↑   | 85.00 | 15 |
| P-9  | M-3 | 6.00 | ↑   | 9.00  | —   | —    | ↑   | 85.00 | 40 |
| P-10 | M-4 | 2.25 | ↑   | 12.75 | —   | —    | ↑   | 85.00 | 15 |
| P-11 | ↑   | 6.00 | ↑   | 9.00  | —   | —    | ↑   | 85.00 | 40 |
| P-12 | ↑   | 6.00 | ↑   | 4.50  | I-1 | 4.50 | ↑   | 85.00 | 40 |
| P-13 | M-2 | 4.50 | S-1 | 10.50 | —   | —    | ↑   | 85.00 | 40 |
| P-14 | ↑   | 4.50 | S-2 | 10.50 | —   | —    | ↑   | 85.00 | 40 |
| P-15 | ↑   | 4.50 | S-4 | 10.50 | —   | —    | ↑   | 85.00 | 40 |
| P-16 | ↑   | 4.50 | S-5 | 10.50 | —   | —    | ↑   | 85.00 | 40 |
| P-17 | ↑   | 4.50 | S-6 | 10.50 | —   | —    | ↑   | 85.00 | 40 |

Preparation of Discharge Electrode Paste

The discharge electrode paste was prepared by mixing Cu powder having an average particle diameter of about 1 μm at about 40 wt %, Cu powder having an average particle diameter of about 3 μm at about 40 wt %, and an organic vehicle at about 20 wt %. Note that the organic vehicle used in the preparation of the discharge electrode paste was a vehicle prepared by dissolving ethyl cellulose in terpineol, and the ethyl cellulose content in the organic vehicle was about 10 wt %.

Preparation of Hollow Cavity Portion Formation Paste

The hollow cavity portion formation paste was prepared by proportioning and mixing crosslinked acrylic resin beads having an average particle diameter of about 1 μm at about 38 wt %, and about 62 wt % of an organic vehicle in which about 10 wt % of ethocel resin was dissolved in terpineol.

Preparation of Outer Electrode Paste

The outer electrode paste was prepared by proportioning and milling Cu powder having an average particle diameter of about 1 μm at about 80 wt %, borosilicate alkali glass frits having a transition point of about 620° C., a softening point of about 720° C., and an average particle diameter of about 1 μm at about 5 wt %, and an organic vehicle in which acrylic resin was dissolved in terpineol at about 15 wt %. The acrylic resin content in the organic vehicle was about 20 wt %.

The ESD protection devices according to Examples 1 to 21 were manufactured through the procedures described below using the ceramic green sheets, the discharge auxiliary electrode paste, the discharge electrode paste, the hollow cavity portion formation paste, and the outer electrode paste prepared in this manner. The ESD protection devices according to Examples 1 to 21 have the same structures as the structures illustrated in FIGS. 1 and 3.

Example 1

Step A

The P-1 discharge auxiliary electrode paste was applied to the ceramic green sheet in a shape corresponding to the discharge auxiliary electrode.

Step B

Next, the discharge electrode paste was applied in a shape in which a pair of discharge electrode pastes oppose each other in the length direction on the discharge auxiliary electrode paste. The distance between the opposing pair of discharge electrode pastes (the first and second unfired discharge electrodes) was set to about 24 μm.

Step C

Next, the hollow cavity portion formation paste was applied so as to cover the opposing portions of the discharge electrode pastes.

Step D

A new ceramic green sheet was stacked upon the ceramic green sheet on which the discharge auxiliary electrode paste, the discharge electrode pastes, and the hollow cavity portion formation paste were applied in this manner, a plurality of new ceramic green sheets were further stacked thereabove and therebelow, and the ceramic green sheets were then pressure-bonded to obtain a mother multilayer body having a thickness of about 0.3 mm. The mother multilayer body was cut in the thickness direction so as to have an approximately 1.0 mm×0.5 mm rectangular planar shape, thus producing chips corresponding to individual ESD protection device units. The dimensions of the obtained chip (unfired multilayer body) were about 1.0 mm (length L)×about 0.5 mm (width W)×about 0.3 mm (thickness T).

Step E

The chip obtained in step D was then fired in a $N_2/H_2/H_2O$ atmosphere while maintaining the oxygen partial pressure $P_{O2}$ greater than or equal to the equilibrium oxygen partial pressure of C (carbon) and less than or equal to the equilibrium oxygen partial pressure of Cu.

Step F

The outer electrode paste was applied to both end portions of the fired chip. The outer electrode paste was applied to both end portions of the chip so as to make contact with the first and second discharge electrodes, respectively, within the chip.

Step G

The first and second outer electrodes were formed by baking the outer electrode paste applied to both end portions of the chip. The ESD protection device according to Example 1 was obtained in this manner.

Examples 2 to 12

The ESD protection devices according to Examples 2 to 12 were manufactured through same procedure as in Example 1, with the exception of P2 to 12 being used for the discharge auxiliary electrode paste instead of P-1.

Example 13

The ESD protection device according to Example 13 was manufactured through the same procedure as for Example 3, except that step E was carried out in an $Ar/H_2/H_2O$ atmosphere.

Example 14

The ESD protection device according to Example 14 was manufactured through the same procedure as for Example 6, except that step E was carried out in an $Ar/H_2/H_2O$ atmosphere.

Example 15

The ESD protection device according to Example 15 was manufactured through the same procedure as for Example 3, except that the distance between the unfired discharge electrodes was set to about 12 µm.

Example 16

The ESD protection device according to Example 16 was manufactured through the same procedure as for Example 3, except that the distance between the unfired discharge electrodes was set to about 60 µm.

Examples 17 to 21

The ESD protection devices according to Examples 17 to 21 were manufactured through the same procedure as in Example 1, with the exception of P13 to 17 being used for the discharge auxiliary electrode paste instead of P-1.

The manufacturing conditions of the ESD protection devices according to Examples 1 to 21 are indicated in the following Table 3.

TABLE 3

| EXAMPLE | DISCHARGE AUXILIARY ELECTRODE PASTE | DISTANCE BETWEEN UNFIRED DISCHARGE ELECTRODES (µm) | FIRING ATMOSPHERE |
|---|---|---|---|
| 1 | P-1 | 24 | $N_2/H_2/H_2O$ |
| 2 | P-2 | 24 | $N_2/H_2/H_2O$ |
| 3 | P-3 | 24 | $N_2/H_2/H_2O$ |
| 4 | P-4 | 24 | $N_2/H_2/H_2O$ |
| 5 | P-5 | 24 | $N_2/H_2/H_2O$ |
| 6 | P-6 | 24 | $N_2/H_2/H_2O$ |
| 7 | P-7 | 24 | $N_2/H_2/H_2O$ |
| 8 | P-8 | 24 | $N_2/H_2/H_2O$ |
| 9 | P-9 | 24 | $N_2/H_2/H_2O$ |
| 10 | P-10 | 24 | $N_2/H_2/H_2O$ |
| 11 | P-11 | 24 | $N_2/H_2/H_2O$ |
| 12 | P-12 | 24 | $N_2/H_2/H_2O$ |
| 13 | P-3 | 24 | $Ar/H_2/H_2O$ |
| 14 | P-6 | 24 | $Ar/H_2/H_2O$ |
| 15 | P-3 | 12 | $N_2/H_2/H_2O$ |
| 16 | P-3 | 60 | $N_2/H_2/H_2O$ |
| 17 | P-13 | 24 | $N_2/H_2/H_2O$ |
| 18 | P-14 | 24 | $N_2/H_2/H_2O$ |
| 19 | P-15 | 24 | $N_2/H_2/H_2O$ |
| 20 | P-16 | 24 | $N_2/H_2/H_2O$ |
| 21 | P-17 | 24 | $N_2/H_2/H_2O$ |

The obtained ESD protection devices according to Examples 1 to 21 were subjected to the following structural analyses.

Distance between Discharge Electrodes

The ESD protection device was polished in the direction of the LW plane (a plane orthogonal or substantially orthogonal to the thickness direction) so as to expose the first and second discharge electrodes and the discharge auxiliary electrode. The distance between the exposed first discharge electrode and second discharge electrode was measured using a microscope. This process was carried out on ten ESD protection devices according to each example, and an average value of the measured distances was determined. This average value was taken as the "distance between discharge electrodes".

Constituent Components of Discharge Auxiliary Electrode

The ESD protection device was polished in the direction of the LW plane so as to expose the first and second discharge electrodes and the discharge auxiliary electrode. The exposed discharge auxiliary electrode was subjected to microfocus X-ray analysis, and the constituent components of the discharge auxiliary electrode were identified from the peaks obtained as a result.

Average Particle Diameter of Metal Particles in Discharge Auxiliary Electrode

The ESD protection device was polished in the direction of the LT plane (the plane orthogonal or substantially orthogonal to the width direction) to an approximately ½ W point (a point halfway along the width dimension of the ESD protection device) so as to expose a cross-section of the discharge auxiliary electrode. An SEM image of the exposed discharge auxiliary electrode part was captured (a reflection electron image; 10,000×), and of the metal particles appearing in the obtained image, the lengths of the long sides of particles located entirely within the image were measured. This process was carried out on ten ESD protection devices according to each example, and an average value of the measured lengths of the long sides was determined. This average value was taken as the "average particle diameter of metal particles" in the discharge auxiliary electrode.

Density of Metal Particles in Discharge Auxiliary Electrode

The ESD protection device was polished in the direction of the LT plane to the approximately ½ W point so as to expose a cross-section of the discharge auxiliary electrode. An SEM image of the exposed discharge auxiliary electrode was captured (a reflection electron image; 10,000×), and the total number of metal particles present in an approximately 50 μm² surface area range of the discharge auxiliary electrode was counted in the obtained image. This process was carried out on ten ESD protection devices according to each example, and an average value of the total number of metal particles was determined. This average value was taken as the "density of metal particles" in the discharge auxiliary electrode.

Oxygen-Containing Layer of Semiconductor Particles in Discharge Auxiliary Electrode The ESD protection device was polished in the direction of the LT plane to the approximately ½ W point so as to expose a cross-section of the discharge auxiliary electrode. The exposed discharge auxiliary electrode was sampled using a FIB. A TEM image (acceleration voltage: about 200 kV; magnification: about 80 k) of a cross-section of the obtained sample was captured, and element mapping was carried out for Si, O, C, and Cu through a combination with EDX; it was confirmed that the primary components of the oxygen-containing layer present on the surfaces of the semiconductor particles were Si and O. Based on this result, it is thought that the oxygen-containing layer contains $SiO_2$. A WDX image of the Si, O, and C that were subjected to element mapping was then combination mapped, and image software was used to calculate contour lines L of the surfaces of the SiC particles and contour lines L' of the $SiO_2$ layer covering the surfaces of the SiC particles. L'/L was determined on the basis of the calculated L and L', and a judgment of "oxygen-containing layer present on surface" was made for SiC particles for which L'/L≥about 0.75, whereas a judgment of "oxygen-containing layer not present on surface" was made for SiC particles for which L'/L<about 0.75. This operation was carried out for all SiC particles present in the WDX image whose long sides were greater than or equal to about 0.5 μm. In the case where a judgment of "oxygen-containing layer present on surface" was made for all SiC particles for which L'/L was determined, the discharge auxiliary electrode in the ESD protection device according to that example was evaluated as "containing semiconductor particles including oxygen-containing layer on surface"; this is indicated with a "○" in the following Table 4. On the other hand, in the case where a judgment of "oxygen-containing layer not present on surface" was made for even one of the SiC particles for which L'/L was determined, the discharge auxiliary electrode in the ESD protection device according to that example was evaluated as "not containing semiconductor particles including oxygen-containing layer on surface"; this is indicated with a "x" in the following Table 4. Furthermore, the thickness of the oxygen-containing layer was measured for all of the SiC particles for which L'/L was determined, and the average thickness of the oxygen-containing layer was then determined.

Primary Components of Gas Present in Hollow Cavity Portion

The primary components of the gas present in the hollow cavity portion were measured through the following procedure. 20 ESD protection devices according to each example were prepared. The ESD protection devices were fractured within a vacuum, and the components present in the gas produced were analyzed using a mass spectrometer (MS) to identify the primary components of the gas present in the hollow cavity portion.

The structural analysis results of the ESD protection devices according to Examples 1 to 21 are indicated in the following Table 4.

TABLE 4

| EXAMPLE | DISTANCE BETWEEN DISCHARGE ELECTRODES (μm) | CONSTITUENT COMPONENTS OF DISCHARGE AUXILIARY ELECTRODE | METAL PARTICLES | | OXYGEN-CONTAINING LAYER | | | PRIMARY COMPONENT OF GAS IN HOLLOW CAVITY PORTION |
|---|---|---|---|---|---|---|---|---|
| | | | AVG. PARTICLE DIAMETER (μm) | DENSITY (PARTICLES/ 50 μm²) | PRESENCE/ ABSENCE | AVG. THICKNESS (μm) | PRIMARY COMPONENT | |
| 1 | 20 | Cu, SiC | 0.85 | 10 | ○ | 50 | Si, O | $N_2$ |
| 2 | 20 | Cu, SiC | 0.85 | 20 | ○ | 50 | Si, O | $N_2$ |
| 3 | 20 | Cu, SiC | 0.85 | 30 | ○ | 50 | Si, O | $N_2$ |
| 4 | 20 | Cu, SiC | 0.94 | 33 | ○ | 50 | Si, O | $N_2$ |
| 5 | 20 | Cu, SiC | 1.70 | 40 | ○ | 50 | Si, O | $N_2$ |
| 6 | 20 | Cu, SiC, $Al_2O_3$ | 0.73 | 40 | ○ | 50 | Si, O | $N_2$ |
| 7 | 20 | Cu, SiC $Al_2O_3$ | 0.66 | 55 | ○ | 50 | Si, O | $N_2$ |
| 8 | 20 | Cu, SiC | 0.30 | 170 | ○ | 50 | Si, O | $N_2$ |
| 9 | 20 | Cu, SiC | 1.50 | 25 | ○ | 50 | Si, O | $N_2$ |
| 10 | 20 | Cu, SiC | 1.50 | 15 | ○ | 50 | Si, O | $N_2$ |
| 11 | 20 | Cu, SiC | 2.20 | 21 | ○ | 50 | Si, O | $N_2$ |
| 12 | 20 | Cu, SiC | 1.70 | 32 | ○ | 50 | Si, O | $N_2$ |
| 13 | 20 | Cu, SiC | 0.85 | 30 | ○ | 50 | Si, O | Ar |
| 14 | 20 | Cu, SiC | 0.73 | 40 | ○ | 50 | Si, O | Ar |
| 15 | 10 | Cu, SiC | 0.85 | 30 | ○ | 50 | Si, O | $N_2$ |
| 16 | 50 | Cu, SiC | 0.85 | 30 | ○ | 50 | Si, O | $N_2$ |
| 17 | 20 | Cu, SiC | 0.85 | 30 | x | 8 | Si, O | $N_2$ |
| 18 | 20 | Cu, SiC | 0.85 | 30 | ○ | 10 | Si, O | $N_2$ |
| 19 | 20 | Cu, SiC | 0.85 | 30 | ○ | 110 | Si, O | $N_2$ |
| 20 | 20 | Cu, SiC | 0.85 | 30 | ○ | 150 | Si, O | $N_2$ |
| 21 | 20 | Cu, SiC | 0.85 | 30 | ○ | 20 | Si, O | $N_2$ |

Comparing Examples 1 to 5, it can be seen that as the ratio of metal particles within the non-combustive components contained in the discharge auxiliary electrode paste increases, the average particle diameter of the metal particles within the discharge auxiliary electrode in the obtained ESD protection device tends to increase. This trend can also be confirmed by comparing Examples 10 and 11. These trends can be thought of as being due to the metal particles sintering with each other more easily in the firing of step E as the ratio of metal particles within the non-combustive components increases. Additionally, comparing Examples 1 to 5, it can be seen that as the ratio of metal particles within the non-combustive components contained in the discharge auxiliary electrode paste increases, the density of the metal particles within the discharge auxiliary electrode in the obtained ESD protection device increases. This trend can also be confirmed by comparing Examples 10 and 11.

Comparing Examples 3 and 17 to 21, it can be seen that in the case where the specific surface area of the semiconductor particles contained in the discharge auxiliary electrode paste is about 3 $m^2$/g to about 15 $m^2$/g, the average particle diameter and density of the metal particles within the discharge auxiliary electrode in the obtained ESD protection device have the same values.

Comparing Examples 3 and 6, it can be seen that when insulating particles are added to the discharge auxiliary electrode paste, the average particle diameter of the metal particles within the discharge auxiliary electrode in the obtained ESD protection device decreases and the density of the metal particles increases. This is thought to be because adding insulating particles to the discharge auxiliary electrode paste suppresses or prevents the metal particles from sintering with each other during the firing in step E. Furthermore, comparing Examples 6 and 7, it can be seen that when the amount of insulating particles added is increased, the average particle diameter of the metal particles within the discharge auxiliary electrode in the obtained ESD protection device further decreases and the density of the metal particles further increases.

Comparing Examples 2, 8, and 10, it can be seen that as the average particle diameter of metal particles contained in the discharge auxiliary electrode paste increases, the average particle diameter of the metal particles within the discharge auxiliary electrode in the obtained ESD protection device increases and the density of the metal particles decreases. Such a trend can also be confirmed by comparing Examples 4, 9, and 11.

Comparing Examples 3, 6, 13, and 14, it can be seen that even in the case where the atmosphere for the firing of step E is changed, the average particle diameter and density of the metal particles within the discharge auxiliary electrode in the obtained ESD protection device do not change.

Comparing Examples 3, 15, and 16, it can be seen that adjusting the distance between the unfired discharge electrodes formed by applying the discharge electrode paste makes it possible to change the distance between discharge electrodes in the obtained ESD protection device.

Comparing Examples 3 and 17 to 21, the semiconductor particles contained in the discharge auxiliary electrode were evaluated as not having the oxygen-containing layer on their surfaces for the ESD protection device according to Example 17, which was manufactured using, as the raw material, the semiconductor particles S-1, whose oxygen content is about 0.6 wt % and whose surface $SiO_2$ amount is about 0.3 wt %. As opposed to this, the semiconductor particles contained in the discharge auxiliary electrode were evaluated as having the oxygen-containing layer on their surfaces for the ESD protection devices obtained in the case where the semiconductor particles whose oxygen content is about 1.0 wt % to about 7.0 wt % and whose surface $SiO_2$ amount is about 1.3 wt % to about 10.2 wt % were used as the raw material. Meanwhile, comparing Examples 3 and 18 to 21, it can be seen that as the oxygen content and surface $SiO_2$ amount in the raw material semiconductor particles increase, so does the average thickness of the oxygen-containing layer present on the surfaces of the semiconductor particles contained in the discharge auxiliary electrode in the obtained ESD protection device. Furthermore, comparing Examples 18 and 21, it can be seen that in the case where the raw material semiconductor particles include the same oxygen contents and surface $SiO_2$ amounts, a lower specific surface area of the raw material semiconductor particles results in a greater average thickness of the oxygen-containing layer present on the surface of the semiconductor particles in the obtained ESD protection device.

Next, the ESD protection characteristics indicated below were evaluated using the ESD protection devices according to Examples 1 to 21.

Initial Insulation Properties

A voltage of about 15 V was applied between the outer electrodes of the ESD protection device, and a resistance value (IR) between the outer electrodes was measured. This process was carried out on 100 ESD protection devices according to each example, and an average value of the resistance values was determined. An average resistance value of log IR≥7 was evaluated as "good (◯)" initial insulation properties, and an average resistance value of log IR<7 was evaluated as "poor (x)" initial insulation properties. The results are indicated in Table 5. ESD protection devices evaluated as having "poor (x)" initial insulation properties are unsuitable for practical applications, and thus were not subjected to the approximately 2 kV operation rate evaluation described next.

Operation Rate at Approximately 2 kV

The operation rate at approximately 2 kV was evaluated through contact discharge on the basis of the IEC 61000-4-2 standard defined by the International Electrotechnical Commission (IEC). An approximately 2 kV voltage was applied between the outer electrodes of the ESD protection device, a peak voltage value ($V_{peak}$) was measured, and it was determined that a discharge had started between the discharge electrodes, or in other words, that the ESD protection device had operated, in the case where $V_{peak}$ about 500 V. This process was carried out for 100 ESD protection devices according to each example, and the percentage of the 100 ESD protection devices for which discharges started was taken as the operation rate (%) at about 2 kV. Devices having an operation rate at about 2 kV of 100% were evaluated as "very good (⊚)", greater than or equal to 90% and less than 100% as "good (◯)", greater than or equal to 70% and less than 90% as "fair (Δ)", and less than 70% as "poor (x)". The results are indicated in Table 5. Note that ESD protection devices judged as "x" are considered to be unsuitable for practical applications.

Measuring Resistance Value after ESD Application

The resistance value of the ESD protection device after ESD application was measured through the following procedure, on the basis of IEC standard IEC61000-4-2. An approximately 8 kV ESD was applied to the ESD protection device 100 times through contact discharge, and the resistance value (IR) was then measured. This process was carried out on 5 ESD protection devices according to each example, and the average value thereof was defined as the resistance value (IR) after ESD application. A post-ESD application resistance value of greater than or equal to about $10^6 Ω$ (log IR=6) was evaluated as "very good (⊚)", greater than or equal to about $10^4 Ω$ (log IR=4) and less than about $10^6 \Omega$ as "good (○)", greater than or equal to about $10^3 \Omega$ (log IR=3) and less than about $10^4 \Omega$ as "fair (Δ)", and less than about $10^3 \Omega$ as "poor (x)". The results are indicated in Table 5. Note that ESD protection devices judged as "x" are considered to be unsuitable for practical applications.

TABLE 5

| EXAMPLE | INITIAL INSULATION PROPERTIES | OPERATION RATE AT About 2 kV | POST-ESD APPLICATION IR |
|---|---|---|---|
| 1 | ○ | X | ⊙ |
| 2 | ○ | Δ | ⊙ |
| 3 | ○ | Δ | ⊙ |
| 4 | ○ | Δ | ⊙ |
| 5 | X | — | ⊙ |
| 6 | ○ | ○ | ⊙ |
| 7 | ○ | ⊙ | ⊙ |
| 8 | ○ | ⊙ | ⊙ |
| 9 | ○ | Δ | ⊙ |
| 10 | ○ | X | ⊙ |
| 11 | X | — | ⊙ |
| 12 | ○ | X | ⊙ |
| 13 | ○ | ○ | ⊙ |
| 14 | ○ | ⊙ | ⊙ |
| 15 | ○ | Δ | ⊙ |
| 16 | ○ | Δ | ⊙ |
| 17 | ○ | Δ | X |
| 18 | ○ | Δ | Δ |
| 19 | ○ | Δ | ⊙ |
| 20 | ○ | Δ | ⊙ |
| 21 | ○ | Δ | ○ |

As indicated in Table 5, the ESD protection devices according to Examples 1 to 4, 6 to 10, and 12 to 21 showed favorable initial insulation properties. On the other hand, the ESD protection devices according to Examples 5 and 11 showed initial insulation properties unsuitable for practical applications. Comparing Examples 1 to 4 with Example 5, it can be seen that when the volume fraction of metal particles relative to all non-combustive components within the discharge auxiliary electrode paste exceeds about 40 vol %, the average particle diameter of the metal particles present within the discharge auxiliary electrode in the obtained ESD protection device becomes greater than about 1.5 μm, and the initial insulation properties worsen as a result. Meanwhile, comparing Examples 4 and 9 with Example 11, it can be seen that when the average particle diameter of the metal particles within the discharge auxiliary electrode paste exceeds about 1.0 μm, the average particle diameter of the metal particles present within the discharge auxiliary electrode in the obtained ESD protection device becomes greater than about 1.5 μm, and the initial insulation properties worsen as a result.

As indicated in Table 5, the ESD protection devices according to Examples 2 to 4, 6 to 9, and 13 to 21 showed operation rates suitable for practical applications at approximately 2 kV. On the other hand, the ESD protection devices according to Examples 1, 10, and 12 showed operation rates not suitable for practical applications at approximately 2 kV. Comparing Example 1 with Examples 2 to 4, it can be seen that when the volume fraction of the metal particles relative to all the non-combustive components within the discharge auxiliary electrode paste is lower than about 15 vol %, the density of the metal particles present within the discharge auxiliary electrode in the obtained ESD protection device becomes lower than about 20 particles/50 μm², and the operation rate at approximately 2 kV drops as a result.

Comparing Examples 3 and 6, it can be seen that when insulating particles are added to the discharge auxiliary electrode paste, the average particle diameter of the metal particles within the discharge auxiliary electrode in the obtained ESD protection device decreases and the density of the metal particles increases, and the operation rate at approximately 2 kV is improved as a result. Furthermore, comparing Examples 6 and 7, it can be seen that increasing the amount of insulating particles added further improves the operation rate at approximately 2 kV.

Comparing Examples 2, 8, and 9, it can be seen that reducing the average particles of the metal particles contained in the discharge auxiliary electrode paste and increasing the volume fraction of the metal particles relative to all non-combustive components within the discharge auxiliary electrode paste further reduce the average particle diameter of the metal particles within the discharge auxiliary electrode in the obtained ESD protection device and further increase the density of the metal particles, and an extremely favorable operation rate can be achieved at approximately 2 kV as a result.

Based on Example 10, it can be seen that when the average particle diameter of the metal particles contained in the discharge auxiliary electrode paste exceeds about 1.0 μm and the volume fraction of the metal particles relative to all non-combustive components within the discharge auxiliary electrode paste is comparatively low, the density of the metal particles within the discharge auxiliary electrode in the obtained ESD protection device becomes lower than about 20 particles/50 μm², and the operation rate at approximately 2 kV drops as a result. Additionally, based on Example 12, it can be seen that when the average particle diameter of the metal particles contained in the discharge auxiliary electrode paste exceeds about 1.0 μm and the volume fraction of the metal particles relative to all non-combustive components within the discharge auxiliary electrode paste is comparatively high, the average particle diameter of the metal particles within the discharge auxiliary electrode in the obtained ESD protection device becomes greater than about 1.5 μm, and the operation rate at approximately 2 kV drops as a result.

Comparing Examples 3 and 6 with Examples 13 and 14, it can be seen that an ESD protection device in which the hollow cavity portion contains Ar gas as a primary component further improves the operation rate at approximately 2 kV compared to an ESD protection device in which the hollow cavity portion contains $N_2$ gas as a primary component.

Based on Examples 3, 15, and 16, it can be seen that even in the case where the distance between discharge electrodes is changed, the same initial insulation properties and the same operation rate at about 2 kV are achieved.

Comparing Examples 3 and 17 to 21, it can be seen that a drop in the resistance value after ESD application cannot be suppressed in the case where the semiconductor particles present in the discharge auxiliary electrode do not have the oxygen-containing layer on their surfaces (Example 17). As opposed to this, it can be seen that a drop in the resistance value after ESD application is able to be significantly reduced or prevented in the case where the semiconductor particles include the oxygen-containing layer on their surfaces (Examples 3 and 18 to 21). Additionally, comparing Examples 3 and 18 to 21, it can be seen that as the average thickness of the oxygen-containing layer increases, the effect of significantly reducing or preventing a drop in the resistance value after ESD application increases as well.

ESD protection devices according to various preferred embodiments of the present invention achieve favorable ESD protection characteristics, and therefore effectively prevent damage and erroneous operations or the like in electronic devices caused by ESD.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrostatic discharge protection device comprising:
    an insulating substrate;
    a first discharge electrode and a second discharge electrodes in contact with the insulating substrate, the first and second discharge electrodes being separated from each other and opposing each other;
    a first outer electrode and a second outer electrodes provided on an outside surface of the insulating substrate, the first outer electrode being electrically connected to the first discharge electrode and the second outer electrode being electrically connected to the second discharge electrode; and
    a discharge auxiliary electrode extending across the first discharge electrode and the second discharge electrode in a region where the first and second discharge electrodes oppose each other; wherein
    the discharge auxiliary electrode includes at least semiconductor particles and metal particles;
    an average particle diameter of the metal particles is approximately 0.3 µm to approximately 1.5 µm;
    a density of the metal particles in a random cross-section of the discharge auxiliary electrode is greater than or equal to approximately 20 particles/50 µm$^2$;
    the metal particles of the discharge auxiliary electrode provide many electric field points and a large amount of leader streamers that include leader streamers provided at an end portion of at least one of the first and second discharge electrodes;
    the semiconductor particles include an oxygen-containing layer on surfaces of the semiconductor particles; and
    an average thickness of the oxygen-containing layer is approximately 10 nm to approximately 150 nm.

2. The electrostatic discharge protection device according to claim 1, wherein the insulating substrate is a ceramic substrate.

3. The electrostatic discharge protection device according to claim 1, wherein the insulating substrate is a resin substrate.

4. The electrostatic discharge protection device according to claim 1, wherein the semiconductor particles are SiC particles.

5. The electrostatic discharge protection device according to claim 4, wherein the oxygen-containing layer includes $SiO_2$.

6. The electrostatic discharge protection device according to claim 1, wherein the metal particles are Cu particles.

7. The electrostatic discharge protection device according to claim 1, wherein the discharge auxiliary electrode further includes insulating particles.

8. The electrostatic discharge protection device according to claim 7, wherein the insulating particles are $Al_2O_3$ particles.

9. The electrostatic discharge protection device according to claim 1, wherein a distance between discharge electrodes at the region where the first and second discharge electrodes oppose each other is approximately 10 µm to approximately 50 µm.

10. The electrostatic discharge protection device according to claim 1, wherein the first and second discharge electrodes are disposed within the insulating substrate, and the first and second discharge electrodes are separated from each other and opposing each other within a hollow cavity portion in the insulating substrate.

11. The electrostatic discharge protection device according to claim 1, wherein the first and second discharge electrodes are disposed on an outside surface of the insulating substrate.

12. The electrostatic discharge protection device according to claim 10, wherein the hollow cavity portion includes a noble gas.

13. The electrostatic discharge protection device according to claim 12, wherein the noble gas is Ar.

* * * * *